(12) United States Patent
Inoue et al.

(10) Patent No.: US 7,823,671 B2
(45) Date of Patent: Nov. 2, 2010

(54) COOLING STRUCTURE OF HEAT GENERATING MEMBER

(75) Inventors: Yoshimitsu Inoue, Chiryu (JP); Masamichi Makihara, Anjo (JP); Takashi Yamanaka, Kariya (JP)

(73) Assignee: Denso Corporation, Kariya (JP)

( * ) Notice: Subject to any disclaimer, the term of this patent is extended or adjusted under 35 U.S.C. 154(b) by 1099 days.

(21) Appl. No.: 11/344,822

(22) Filed: Feb. 1, 2006

(65) Prior Publication Data
US 2006/0169507 A1 Aug. 3, 2006

(30) Foreign Application Priority Data
Feb. 2, 2005 (JP) .............................. 2005-026443

(51) Int. Cl.
*B60K 11/00* (2006.01)
(52) U.S. Cl. ..................... 180/68.4; 180/68.5; 180/68.1
(58) Field of Classification Search ................ 180/68.4, 180/68.6, 68.1, 68.2; 429/120
See application file for complete search history.

(56) References Cited

U.S. PATENT DOCUMENTS

| | | | | |
|---|---|---|---|---|
| 4,945,010 | A * | 7/1990 | Kaufman et al. ............... 429/26 |
| 5,356,735 | A * | 10/1994 | Meadows et al. ............ 429/120 |
| 5,424,143 | A * | 6/1995 | Shrim .......................... 429/26 |
| 5,490,572 | A | 2/1996 | Tajiri et al. |
| 5,569,557 | A * | 10/1996 | Wagner et al. .................. 429/99 |
| 5,756,227 | A * | 5/1998 | Suzuki et al. ................... 429/62 |
| 6,106,972 | A * | 8/2000 | Kokubo et al. ............... 429/120 |
| 6,394,210 | B2 * | 5/2002 | Matsuda et al. ............. 180/68.1 |
| 6,437,537 | B2 | 8/2002 | Park |
| 6,450,275 | B1 | 9/2002 | Gabriel et al. |
| 6,512,347 | B1 * | 1/2003 | Hellmann et al. ............ 320/107 |
| 6,542,365 | B2 | 4/2003 | Inoue |
| 6,662,891 | B2 * | 12/2003 | Misu et al. ................... 180/68.1 |
| 6,709,783 | B2 * | 3/2004 | Ogata et al. .................. 429/120 |
| 6,815,109 | B2 * | 11/2004 | Okamoto et al. .............. 429/26 |
| 6,819,085 | B2 * | 11/2004 | Kimoto ....................... 320/150 |
| 6,845,012 | B2 * | 1/2005 | Ohkouchi .................... 361/704 |

(Continued)

FOREIGN PATENT DOCUMENTS

JP 11-204151 7/1999

(Continued)

OTHER PUBLICATIONS

Office action dated Jun. 27, 2008 in Chinese Application No. 2006 10006648.5 with English translation.

(Continued)

*Primary Examiner*—J. Allen Shriver, II
*Assistant Examiner*—Katy Meyer
(74) *Attorney, Agent, or Firm*—Harness, Dickey & Pierce, PLC

(57) ABSTRACT

A cooling structure includes a plurality of plate-shaped heat generating members such as battery parts, DC voltage converters and electrical member (e.g., relay). In the cooling structure, the heat generating members are arranged in a plate-thickness direction to have predetermined spaces for forming fluid passages each of which is provided between adjacent heat generating members, and the fluid passages are provided to pass a fluid for cooling the heat generating members. Accordingly, all the heat generating members can be effectively cooled while the cooling structure can be made compact.

51 Claims, 19 Drawing Sheets

U.S. PATENT DOCUMENTS

| | | |
|---|---|---|
| 7,074,517 B2 * | 7/2006 | Higashino ................. 429/66 |
| 7,147,963 B2 * | 12/2006 | Kimoto et al. ............. 429/99 |
| 2001/0030069 A1 * | 10/2001 | Misu et al. ................ 180/68.1 |
| 2003/0211384 A1 * | 11/2003 | Hamada et al. ........... 429/120 |
| 2004/0004461 A1 * | 1/2004 | Hamada et al. ........... 320/112 |
| 2004/0144996 A1 | 7/2004 | Inoue |
| 2004/0201366 A1 * | 10/2004 | Kimoto et al. ............. 320/150 |
| 2004/0206474 A1 * | 10/2004 | Watanabe et al. .......... 165/51 |
| 2005/0011692 A1 * | 1/2005 | Takahashi et al. ......... 180/68.5 |
| 2005/0040515 A1 | 2/2005 | Inoue et al. |
| 2005/0051298 A1 | 3/2005 | Sakai |

FOREIGN PATENT DOCUMENTS

| | | |
|---|---|---|
| JP | 2000-238541 | 9/2000 |
| JP | 2002-056904 | 2/2002 |
| JP | 2002-084604 | 3/2002 |
| JP | 2002-164490 | 6/2002 |
| JP | 2002-184419 | 6/2002 |
| JP | 2003-007355 | 1/2003 |
| JP | 2003-182377 | 7/2003 |
| WO | WO 2004/070860 | 8/2004 |

OTHER PUBLICATIONS

Examination Report dated Jan. 22, 2010 in the corresponding CN application No. 200610006648.5 with English translation.

* cited by examiner

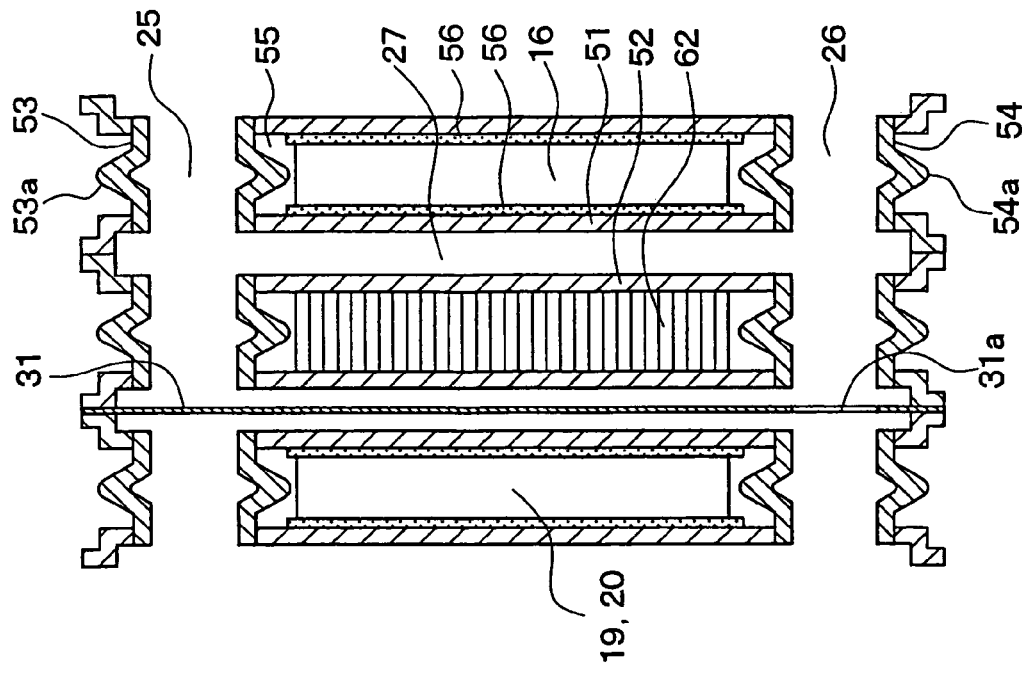
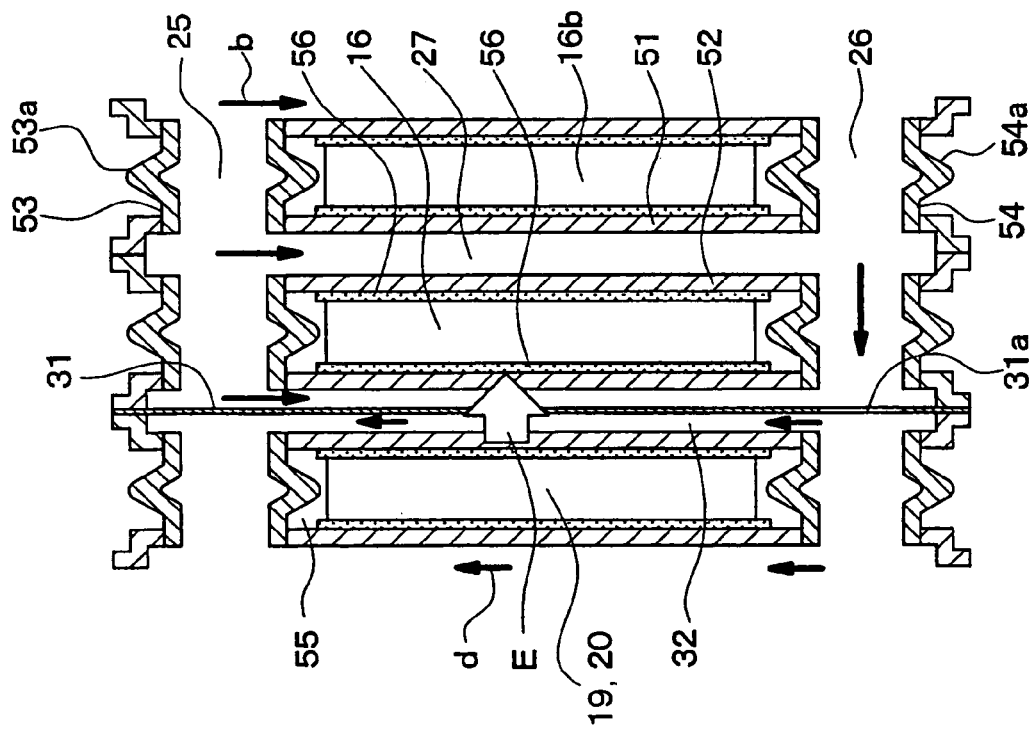

COOLING STRUCTURE OF HEAT GENERATING MEMBER

CROSS REFERENCE TO RELATED APPLICATION

This application is based on Japanese Patent Application No. 2005-26443 filed on Feb. 2, 2005, the contents of which are incorporated herein by reference in its entirety.

FIELD OF THE INVENTION

The present invention relates to a cooling structure, which effectively and collectively cools plural heat generating members.

BACKGROUND OF THE INVENTION

In a battery system for an electrical vehicle described in JP-A-2002-84604, a cooling fan of a battery is provided to cool an electrical part and an electronic control unit. Specifically, the cooling fan is provided in a cool air passage for cooling the battery, and an electrical detector and the electronic control unit are arranged in the cool air passage to be cooled by air blown from the cooling fan. Here, the electrical detector is disposed for detecting a battery charge/discharge current, and the electronic control unit has a microcomputer for calculating a battery remaining capacity.

However, in this battery system, the equipments such as the battery, the electrical part and the electronic control unit are simply located in the cool air passage in block. In this case, a heat transmission area between this equipments and cool air is small. Therefore, cooling performance per volume is decreased. Furthermore, various equipments having different sizes are simply located in the cool air passage, the size of the battery system becomes larger.

SUMMARY OF THE INVENTION

In view of the above-described problems, it is an object of the present invention to provide a cooling structure, which can be made compact while collectively and effectively cooling plural heat generating members.

It is another object of the present invention to provide a cooling structure, which effectively cools first heat generating members operated at a temperature lower than a first control temperature and second heat generating members operated at a temperature lower than a second control temperature lower than the first control temperature, by using a fluid.

According to an aspect of the present invention, a cooling structure includes a plurality of heat generating members each of which has a plate shape, and the heat generating members are arranged in a plate-thickness direction to have predetermined spaces for forming fluid passages each of which is provided between adjacent heat generating members. Furthermore, the fluid passages are provided to pass a fluid for cooling the heat generating members.

Because each of the heat generating members has a plate shape, a heat transmitting area per volume of the heat generating members can be made larger. Furthermore, because the heat generating member are arranged to form the fluid passages between adjacent heat generating members, the heat generating members and the fluid passages can be effectively provided in a compact space. As a result, the heat generating members can be effectively and collectively cooled.

According to another aspect of the present invention, a cooling structure includes a plurality of heat generating members each of which has a plate shape, and a plurality of heat-exchanging plate members arranged to have a plurality of receiving spaces for receiving the heat generating members and a plurality of fluid passages through which a fluid flows. In the cooling structure, the heat generating members are located in the receiving spaces to be cooled by the fluid flowing through the fluid passages from two sides of each heat generating member through the heat-exchanging plate members. Accordingly, each of the heat generating members can be effectively cooled through the heat-exchanging plate members.

For example, an electrical insulating member can be inserted between adjacent two of the heat generating members and the heat-exchanging plate members when the heat generating members are electrical members. Furthermore, a spring member can be disposed to generate a compressing force in a direction for press-contacting the heat generating members and the heat-exchanging plate members to each other.

In the cooling structure, the heat generating members can be accommodated in a single case so as to form a single unit. Furthermore, the heat generating members can be provided with at least first and second different heat generating members which have approximately equal plate surfaces.

Alternatively, the heat generating members include at least a first heat generating member operated to be lower than a first control temperature, and a second heat generating member operated to be lower than a second control temperature higher than the first control temperature. In this case, a thermal insulating member can be arranged instead of one of the heat generating members between the first heat generating member and the second heat generating member. Furthermore, the second heat generating member can be arranged downstream from the first heat generating member in a flow direction of the fluid. In this case, both the first and second heat generating members can be effectively cooled.

Furthermore, the heat generating members can include a plurality of first heat generating members operated to be lower than a first control temperature, and a plurality of second heat generating members operated to be lower than a second control temperature higher than the first control temperature. In this case, a number of the fluid passages between the first heat generating members can be made larger than a number of the fluid passages between the second heat generating members. Furthermore, a fluid rate changing means can be provided for setting a flow speed of the fluid in the fluid passages between the second heat generating members to be higher than a flow speed of the fluid in the fluid passages between the first heat generating members. Alternatively, a total passage sectional area of the fluid passages between the second heat generating members can be made smaller than a total passage sectional area of the fluid passages between the first heat generating members. Accordingly, both the first and second heat generating members can be effectively cooled.

In the cooling structure, the first heat generating member can be a battery part, the second heat generating member can be a DC voltage converter, and the fluid can be water or air. For example, the cooling structure can be provided with at least one of a radiator arranged in a water circuit, for cooling the water flowing to the fluid passage by performing heat exchange with air, and a water-refrigerant heat exchanger for cooling water flowing to the fluid passages by performing heat exchange with refrigerant in a refrigerant cycle.

A unit having a case for accommodating the heat generating members can be located under a seat of a vehicle, or a radiator can be disposed to heat the seat of the vehicle using water from the fluid passages as a heat source.

Furthermore, a passage switching means can be provided for switching fluid passages such that water, heated by the first heat generating member and the second heat generating member to a predetermined temperature, flows into an engine cooling water circuit for cooling a vehicle engine. Alternatively, a passage switching means can be provided for switching fluid passages such that water heated by the second heat generating member directly returns to the first heat generating member.

BRIEF DESCRIPTION OF THE DRAWINGS

The above and other objects, features and advantages of the present invention will become more apparent from the following detailed description of preferred embodiments made with reference to the accompanying drawings, in which:

FIG. 7A is a sectional view showing a part of a heat-exchanging portion, for explaining a fifth embodiment of the present invention, and FIG. 7B is a sectional view showing a part of the heat-exchanging portion of the fifth embodiment;

DETAILED DESCRIPTION OF PREFERRED EMBODIMENTS

First Embodiment

Figure 1:
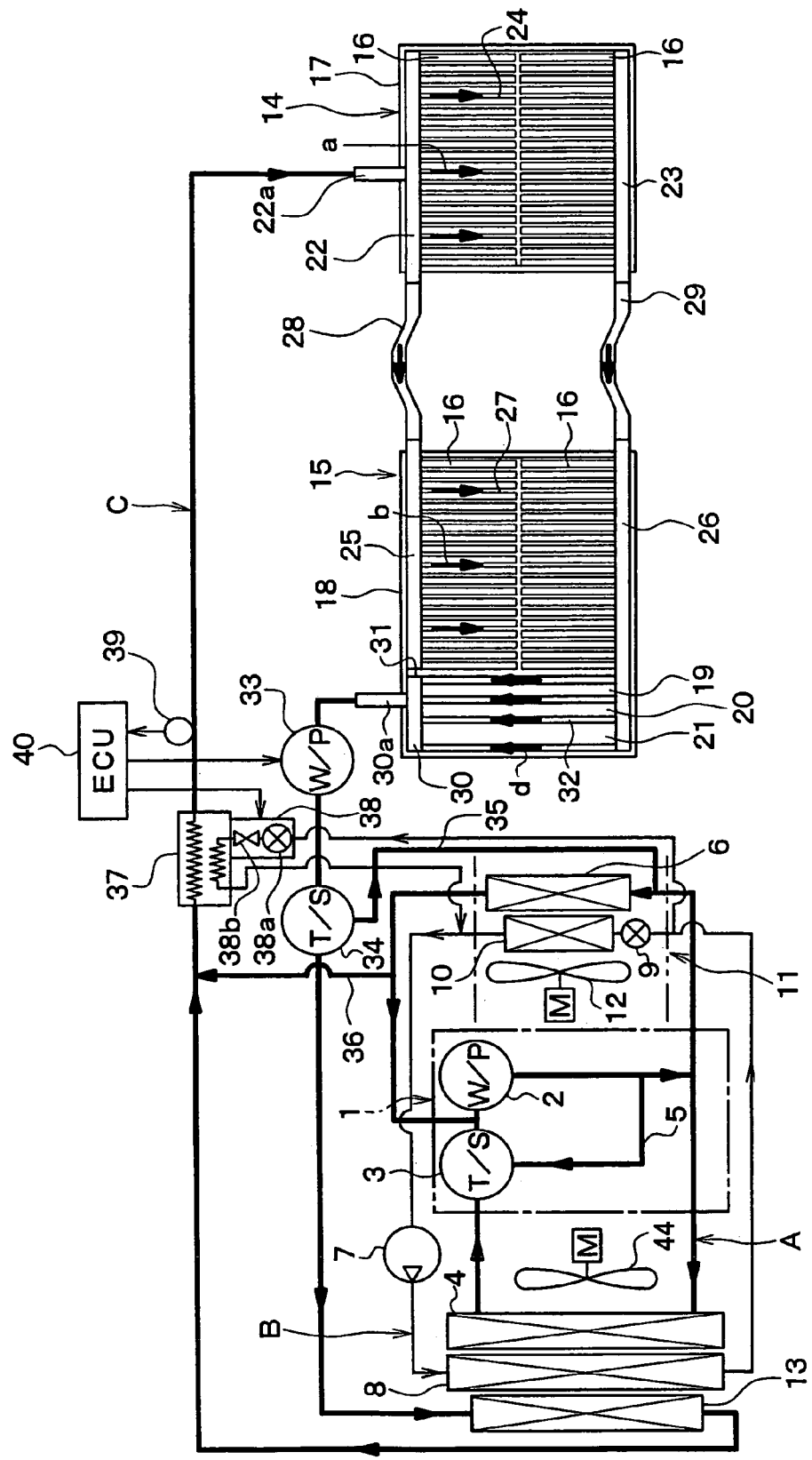
FIG. 1 is a schematic diagram showing an entire system according to a first embodiment of the present invention.

FIG. 1 shows a schematic diagram showing an entire system of the first embodiment. In this embodiment, the present invention is typically applied to a hybrid vehicle which is driven by an engine (internal combustion engine) 1 and an electrical motor (not shown) as driving sources.

The system of the first embodiment is constructed with a cooling water circuit A of an engine 1, a refrigerant cycle B for a vehicle air conditioner, a cooling water circuit C for heat generating members.

The cooling water circuit A of the engine 1 has a structure generally known. A water pump 2 driven and rotated by the engine 1 is located in the cooling water circuit A so as to circulate cooling water in the cooling water circuit A by the operation of the water pump 2.

A thermostat 3 is arranged at a suction side of the water pump 2, and is used as a thermal responding valve operated in accordance with a cooling water temperature. A radiator 4 and a bypass passage 5 are arranged in parallel at a cooling water outlet side of the engine 1. Furthermore, a heater core 6 for heating air to be blown into a passenger compartment using engine-cooling water (hot water) as a heating source is located between the cooling water outlet side of the engine 1 and the suction side of the water pump 2.

A valve body of the thermostat 3 is displaced in accordance with a volume variation that is changed based on the temperature of a thermo-wax (temperature sensing member), so as to open and close a cooling water passage on the side of the radiator 4. For example, when the cooling water temperature is increased to a predetermined temperature (e.g., about 80° C.), the thermostat 3 opens a cooling water passage on an outlet side of the radiator 4 so that the engine-cooling water is cooled in the radiator 4.

The refrigerant cycle B includes a compressor 7 for compressing refrigerant, a condenser 8 for cooling refrigerant discharged from the compressor 7, a decompression unit 9 such as an expansion valve for decompressing refrigerant from the condenser 8, and an evaporator 10 in which refrigerant decompressed in the decompression unit 9 is evaporated by absorbing heat from air to be blown into the passenger compartment. For example, the compressor 7 is an electrical compressor driven and rotated by an electrical motor, or a compressor driven and rotated by the engine 1.

The evaporator 10 and the heater core 6 are arranged in an air passage of an interior air conditioning unit 11 for the vehicle air conditioner, and perform heat exchange with air blown by an electrical blower 12.

In the cooling water circuit C for the heat generating members, a radiator 13 is located. The radiator 13 for the heat generating members is arranged at an upstream portion in an air flow of the condenser 8 of the refrigerant cycle B, and the radiator 4 for the engine is arranged at a downstream portion in the air flow of the condenser 8. The radiator 13 for the heat generating members, the condenser 8 and the radiator 4 for the engine are cooled by air blown by an electrical cooling fan 44.

In the first embodiment, as shown in FIG. 1, first and second cooling units 14, 15 are arranged in the cooling water circuit C for cooling the heat generating members. The first cooling unit 14 is arranged for cooling mainly battery parts 16, and the second cooling unit 15 is arranged for cooling collectively arranged electrical parts such as the battery parts 16, DC voltage converters (DC-DC converter) 19, 20 and an electrical member 21 (e.g., a relay).

The battery having the plural battery parts 16 is a chargeable battery constructed with a lithium battery, for example. In this embodiment, the battery is constructed with a plurality of the battery parts 16, and the battery parts 16 are arranged in series electrically to generate a predetermined high voltage (e.g., 300V). Accordingly, the battery parts 16 are assembled to construct an assembled battery group.

In the first cooling unit 14, plate-shaped battery parts 16 are stacked and arranged in a first case 17 in an arrangement direction (plate-thickness direction) approximately perpendicular to a cooling water flowing direction "a", so as to form a stacked battery group. Furthermore, two stacked battery groups of the plate-shaped battery parts 16 are arranged in two layers in the cooling water flowing direction "a".

In the second cooling unit 15, plate-shaped battery parts 16 are stacked and arranged in a second case 18 in an arrangement direction (plate-thickness direction) approximately perpendicular to a cooling water flowing direction "b", so as to form a stacked battery group. Furthermore, two stacked battery groups of the plate-shaped battery parts 16 are arranged in two layers in the cooling water flowing direction "b". Furthermore, plate-like first and second DC voltage converters 19, 20 and plate-like electrical member 21 are also collectively arranged in the second case 18, in addition to the stacked battery parts 16.

The first DC voltage converter 19 is for reducing DC voltage, for example, from 300V to 12V. The second DC voltage converter 20 is for increasing DC voltage from 300V to 600V. The electrical member 21 is generally called as a junction box, and includes a system main relay, for example.

An inlet passage portion 22 is provided at one end portion of the first case 17 of the first cooling unit 14, and an outlet passage portion 23 is provided at the other end portion thereof, opposite to the one end portion. An inlet pipe 22a is connected to the inlet passage portion 22 so that cooling water from the inlet pipe 22a flows into the inlet passage portion 22. A plurality of flat cooling passages 24 (fluid passages) each of which is arranged between adjacent battery parts 16 extends between both the inlet and outlet passage portions 22 and 23.

An inlet passage portion 25 is provided at one end portion of the second case 18 of the second cooling unit 15, and an intermediate passage portion 26 is provided at the other end portion thereof, opposite to the one end portion. A plurality of flat cooling passages 27 (fluid passage) each of which is arranged between adjacent battery parts 16 extend between both the inlet and outlet passage portions 25 and 26.

The inlet passage portion 22 of the first cooling unit 14 is connected to the inlet passage portion 25 of the second cooling unit 15 through a connection hose 28. Furthermore, the outlet passage portion 23 of the first cooling unit 14 is connected to the intermediate passage portion 26 of the second cooling unit 15 through a connection hose 29.

Accordingly, cooling water flows through all the plural cooling passages 24 within the first cooling unit 14 in parallel as in the arrow "a" in FIG. 1, and cooling water flows through all the plural cooling passages 27 within the second cooling unit 15 in parallel as in the arrow be in FIG. 1.

A partition portion 31 is located between the inlet passage portion 25 and an outlet passage portion 30 to be partitioned from each other at the one end portion of the second case 18. In the second cooling unit 15, the intermediate passage portion 26 extends to communicate with outlets of the cooling passages 27 between the battery parts 16, and inlets of cooling passages 32 (fluid passages) between the DC voltage converters 19, 20 and the electrical member 21. As shown in FIG. 1, the DC voltage converters 19, 20 and the electrical member 21 are arranged between the outlet passage portion 30 and the intermediate passage portion 26 so that water having passed through the cooling passages 27 passes through the cooling passages 32.

An outlet pipe 30a is connected to the outlet passage portion 30. In this embodiment, the cooling passage 32 is arranged between adjacent two of the DC voltage converters 19, 20 and the electrical member 21.

Accordingly, in the second cooling water unit 15, cooling water after passing through the cooling passages 27 of the second cooling unit 15 and cooling water after passing through the cooling passages 24 of the first cooling unit 14 flow into the intermediate passage portion 26. Therefore, cooling water from the cooling passages 24 of the first cooling unit 14 and cooling water from the cooling passages 27 of the second cooling unit 15 are joined in the intermediate passage portion 26, and the joined cooling water flows through the cooling passages 32 as in the arrow "d" in FIG. 1 from the intermediate passage portion 26.

In this embodiment, a total value of passage sectional areas of the plural cooling passages 32 for cooling the DC voltage converters 19, 20 and the electrical member 21 is made sufficiently smaller than a total value of passage sectional areas of the plural cooling passages 24 and 27 for cooling the battery parts 16. Therefore, a flow rate of cooling water in the cooling passages 32 can be sufficiently increased as compared with a flow rate of cooling water in the cooling passages 24, 27 on the side of the battery parts 16.

An electrical water pump 33 is arranged at the outlet side of the second cooling unit 15 in the cooling water circuit C to circulate cooling water in the cooling water circuit C.

A thermostat 34 as a cooling water passage switching means is arranged at a discharge side of the water pump 33. The thermostat 34 is connected to an inlet side of the heater core 6 in the engine cooling water circuit A through a first communication passage 35.

Similarly to the thermostat 3 on the side of the engine 1, the thermostat 34 is a thermo-responding valve. A valve body of the thermostat 34 is displaced in accordance with a volume variation that is changed based on the temperature of a thermo-wax (temperature sensing member), so as to open and close the first communication passage 35.

The thermostat 34 is set to always continue a communication state between a discharge side of the water pump 33 and the radiator 12 for the heat generating members. The valve body of the thermostat 34 opens the first communication passage 35 until the temperature of cooling water at the outlet side of the second cooling unit 15 increases to a predetermined temperature (e.g., 65° C.). When the temperature of the cooling water at the outlet side of the second cooling unit 15 is increased to the predetermined temperature, the valve body of the thermostat 34 closes the first communication passage 35.

The engine cooling water circuit A and the cooling water circuit C for the heat generating member are constructed to form a closed water circuit. Therefore, a second communication passage 36 is arranged to connect both the cooling water circuits A and C. As shown in FIG. 1, the second communication passage 36 is connected to an outlet side of the heater core 6 of the engine cooling water circuit A and an outlet side of the radiator 13 for the heat generating members.

A water-refrigerant heat exchanger 37 is arranged between the cooling water outlet side of the radiator 13 and the first cooling unit 14. In the water-refrigerant heat exchanger 37, low-temperature refrigerant of the refrigerant cycle B is heat exchanged with cooling water in the cooling water circuit C to cool the cooling water of the cooling water circuit C. For example, the water-refrigerant heat exchanger 37 can be constructed with a double-pipe structure having a refrigerant passage and a cooling water passage.

A valve device 38, in which an electromagnetic valve 38a for opening and closing a refrigerant passage and a decompression device 38b for decompressing a high-pressure refrigerant are integrated, is arranged at a refrigerant inlet portion of the water-refrigerant heat exchanger 37. The decompression device 38b can be constructed with a fixed throttle such as an orifice integrated with an inlet refrigerant passage or an outlet refrigerant passage of the electromagnetic valve 38a. The valve device 38 and the water-refrigerant heat exchanger 37 are connected in parallel with the decompression unit 9 and the evaporator 10 of the refrigerant cycle B.

A water temperature sensor 39 is disposed to detect a water temperature at the inlet side of the first cooling unit 14, and a detection signal of the water temperature sensor 39 is input to an electronic control unit (ECU) 40. When the water temperature detected by the water temperature sensor 39 is increased to a predetermined water temperature (50-60° C.), the electromagnetic valve 38a of the valve device 38 is opened by the control unit 40. Operation of the water pump 33, the cooling fan 14, etc. is controlled by the control unit 40.

Figure 2:
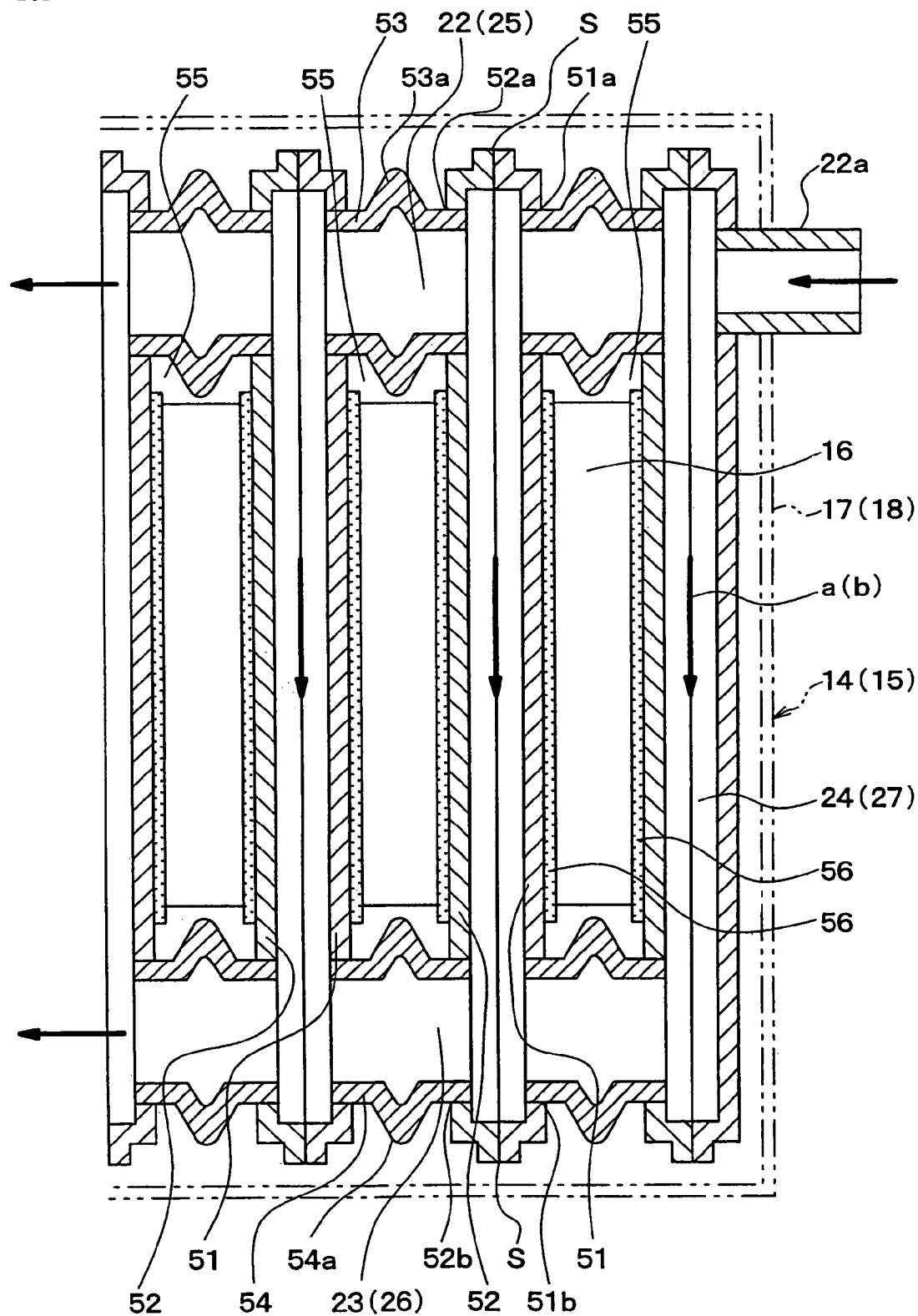
FIG. 2 is a sectional view showing a part of a heat-exchanging portion of a cooling unit for cooling heat generating members according to the first embodiment.

Next, the structure (cooling structure) of the heat exchanging portion of the cooling unit 14, 15 will be now described. FIG. 2 shows a part of the heat exchanging portion of the cooling unit 14 (15). The cooling unit 14 (15) includes a plurality of pairs of heat exchanging plate members 51, 52. Each pair of the heat exchanging plate members 51, 52 are formed from metal thin plate members, and are joined on a joining surface S to protrude outside from the joining surface S. Accordingly, when the pair of the heat exchanging plate members 51, 52 are bonded on the joining surface S to have therein a hollow, the cooling passage 24 (27) shown in FIG. 1 is formed inside the pair of the heat exchanging plate members 51, 52.

Communication holes 51a, 51b are provided at two end portions of the heat exchanging plate member 51 in a plate longitudinal direction, and communication holes 52a, 52b are provided at two end portions of the heat exchanging plate member 52 in the plate longitudinal direction at the same positions as the communication holes 51a, 51b. Furthermore, adjacent communication holes 51a, 52a of the heat exchanging plate members 51, 52 are connected by an inlet pipe member 53, and adjacent communication holes 51b, 52b of the heat exchanging plate members 51, 52 are connected by an outlet pipe member 54. Therefore, the inlet passage portion 22 (25) shown in FIG. 1 is formed inside the inlet pipe member 53, and the outlet passage portion 23 (intermediate passage portion 26) shown in FIG. 1 is formed inside the outlet pipe member 54.

A bent portion (bellows portion) 53a protruding radially outwardly of the inlet pipe member 53 is formed in the inlet pipe member 53 at a center portion of each inlet pipe member 53 in axial direction of the inlet pipe member 53. Similarly, a bent portion (bellows portion) 54a protruding radially outwardly of the outlet pipe member 54 is formed integrally with the outlet pipe member 54 at a center portion of each outlet pipe member 54 in axial direction of the outlet pipe member 54. Accordingly, the pipe members 53 and 54 can be easily elastically deformed in the axial direction of the pipe members 53, 54 by using the bent portions 53a, 54a.

The heat exchanging plate members 51, 52, the pipe members 53, 54 and the inlet pipe 22a, etc. are made of a metal material having a sufficient heat-transmitting performance, for example, aluminum. The connection between the heat exchanging plate members 51 and 52, and the connection between the heat exchanging plate members 51, 52 and the pipe members 53, 54 are performed by brazing. The brazing is performed after those parts are temporarily assembled. For example, a temporarily assembled body is moved in furnace and is integrally brazed and bonded by heating.

In the heat exchanging structure after being integrally bonded, a plurality of flat receiving spaces 55 extending in a direction parallel to the water flowing direction "a" are formed. Each of the flat receiving spaces 55 is formed and defined by outer surfaces of the heat exchanging plate members 51, 52, the inlet pipe member 53 and the outlet pipe member 54.

Then, the plural battery parts 16 formed in plate shapes are received in the receiving spaces 55, respectively. Furthermore, insulating members 56 each of which has a thin plate shape are provided between surfaces of the battery parts 16 and outer surfaces of the heat exchanging plate members 51, 52. That is, each of the insulating members 56 is arranged between the outer surface of the heat exchanging plate member 51, 52 and the outer surface of the battery part 16 so as to insulate therebetween. The insulating member 56 can be made of an insulating material, for example, a ceramic material having a sufficient insulating performance.

Furthermore, each plate-like battery part 16 is inserted between outer side surfaces of the heat exchanging plate members 51, 52 through the insulating members 56 to press-contact the heat exchanging plate members 51, 52. Therefore, heat-exchanging efficiency between the battery parts 16 and the cooling water through the heat exchanging plate members 51, 52 can be increased. The press-contacting state of the battery parts 16 to the heat exchanging plate members 51, 52 can be tightly held by elastic deformation of the bent portions 53a, 54a (bellows portions).

In FIG. 2, an arrangement example, in which battery parts 16 are arranged in a single line in the water flowing direction "a", is explained as an example. That is, in FIG. 2, only one battery part 16 is arranged in the water flowing direction "a". However, two or more battery parts 16 can be arranged in series in the water flowing direction "a" between the outer side surfaces of the heat exchanging plate members 51, 52, as shown in FIG. 1.

FIG. 2 shows an example of the heat exchanging structure of the first cooling unit 14. However, the heat exchanging structure of the area of the battery parts 16 in the second cooling unit 15 can be made similar to that of FIG. 2.

Furthermore, heat exchanging structures of the areas of the DC converters 19, 20 and the electrical member 21 can be made basically similarly to that in the area of the battery parts 16 shown in FIG. 2. In the heat exchanging structures of the areas of the DC converters 19, 20 and the electrical member 21, axial dimensions of the pipe members 53, 54 are changed, or/and passage sectional areas of the cooling passage 32 are changed relative to that of the cooling passages 24, 27. Therefore, the dimensions of the receiving spaces 55 for the DC converters 19, 20 and the electrical member 21 can be suitably changed by changing the axial dimensions of the pipe members 53, 54.

Figure 3:
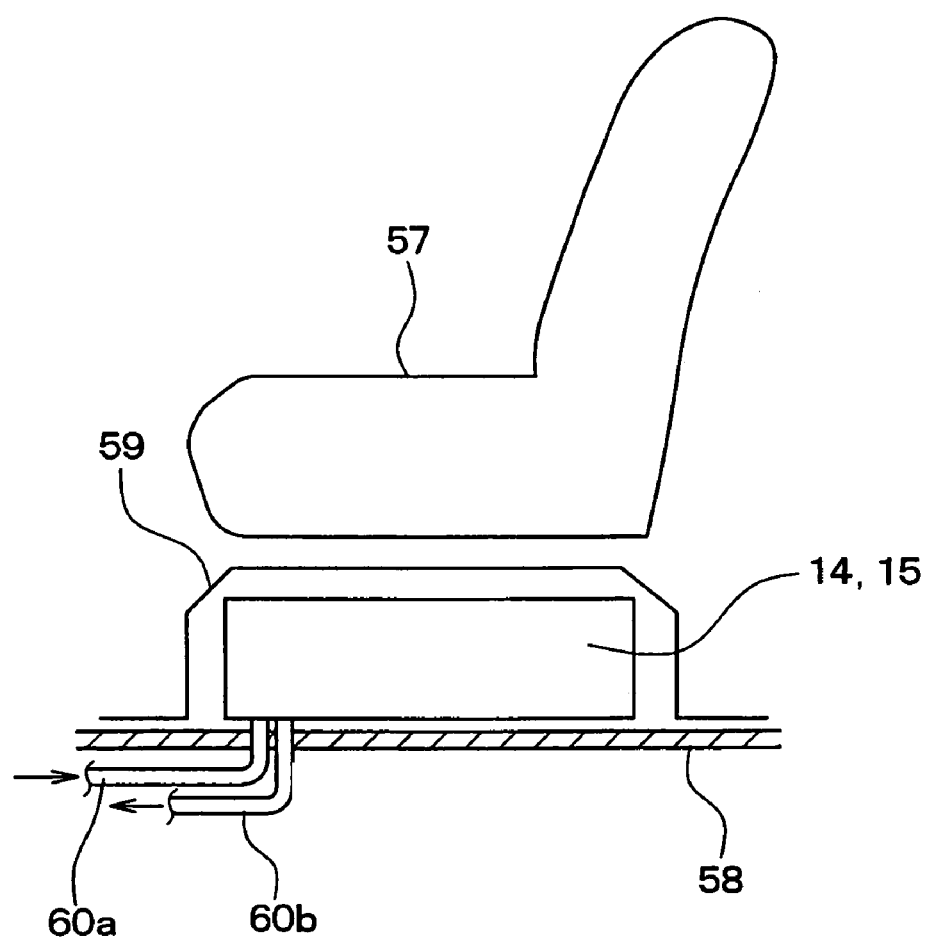
FIG. 3 is a schematic diagram showing a mounting structure of the cooling unit according to the first embodiment.

FIG. 3 shows an example of a mounting structure of the first and second cooling units 14, 15 mounted to a vehicle. As shown in FIG. 3, the first and second cooling units 14, 15 are mounted on an upper surface of a floor plate 58 under a seat 57 of the vehicle. Furthermore, a carpet 59 is arranged to cover the first and second cooling units 14, 15. Water pipes 60a, 60b are arranged under the floor plate 58, and penetrate through the floor plate 58 to be connected to the cooling units 14, 15.

In FIG. 3, the first and second cooling units 14, 15 are mounted above the upper surface of the floor plate 58. However, the first and second cooling units 14, 15 can be mounted under the floor plate 58.

Next, operation of the cooling system (cooling structure) according to the first embodiment will be described. When a vehicle operation switch is operated at an operation position of the vehicle engine 1, electrical current is supplied to the water pump 33 by the electronic control unit 40, and the water pump 33 is operated.

The valve body of the thermostat 34 opens the first communication passage 35 until the cooling water temperature at the outlet side of the second cooling unit 15 is increased to a predetermined temperature (e.g., 65° C.). In this case, the cooling water circuit C for the heat generating members and the engine cooling water circuit A communicate with each other.

In contrast, the electromagnetic valve 38a integrated with the valve device 38 is set to keep a valve closing state until the water temperature at the inlet side of the first cooling unit 14, detected by the water sensor 39, is increased to a predetermined temperature (e.g., 30-40° C.). When the electromagnetic valve 38a is closed, refrigerant does not flow into the refrigerant passage of the water-refrigerant heat exchanger 37. In this case, water only passes through the water-refrigerant heat exchanger 37 without performing a heat exchange.

In this state, a large amount of cooling water sent by the water pump 33 from the outlet of the second cooling water unit 15 flows through the thermostat 34, the first communication passage 35, the heater core 6, the second communication passage 36, the water-refrigerant heat exchanger 37 and the first and second cooling units 14, 15, in this order. At the same time, a small amount of cooling water sent by the water pump 33 flows into the radiator 13.

Accordingly, the temperature of cooling water is increased by absorbing heat in the first and second cooling units 14, 15 of the cooling water circuit C, and the cooling water after being heated in the first and second cooling units 14, 15 is mixed with cooling water of the engine cooling water circuit A at an inlet portion of the heater core 6, thereby increasing the temperature of cooling water in the cooling water circuit A. Thus, heating of the vehicle engine 1 can be facilitated in a cold time during the winter, while heating capacity (quickly heating) of the passenger compartment using the heater core 6 can be improved.

When the cooling water temperature at the outlet side of the second cooling unit 15 is increased to the predetermined temperature, the valve body of the thermostat 34 closes the first communication passage 35 so as to shut a communication between the cooling water circuit C for the heat generating members and the cooling water circuit A. Therefore, all the amount of cooling water of the cooling water circuit C flows into the radiator 13 for the heat generating members to be cooled in the radiator 13.

On the other hand, when the outside air temperature is high in the summer, the cooling performance of the radiator 13 for the heat generating members is decreased. When the cooling water temperature at the outlet side of the radiator 13, that is, the cooling water temperature at the inlet side of the first cooling unit 14 is increased to a set temperature (e.g., 50-60° C.), electrical current is supplied to the electromagnetic valve 38a of the valve device 38 by the electronic control unit 40, and the electromagnetic valve 38a of the valve device 38 is opened. In this case, low-pressure refrigerant decompressed in the decompression unit 38b of the valve device 38 flows into the water-refrigerant heat exchanger 37, and is evaporated by absorbing heat from the cooling water flowing through the cooling passage of the water-refrigerant heat exchanger 37. Accordingly, the cooling water flowing through the cooling passage of the water-refrigerant heat exchanger 37 can be sufficiently cooled by the low-pressure refrigerant. Thus, even at a high outside air temperature in the summer, it can prevent the temperature of the battery parts 16 from being abnormally high.

Next, the cooling operation of the first and second cooling units 14, 15 will be now described. Low-temperature cooling water, cooled by at least one of the radiator 13 for the heat generating members and the water-refrigerant heat exchanger 37, flows through the cooling passages 24 of the first cooling unit 14 and the cooling passages 27 of the second cooling unit 15 in parallel, and thereafter flows into the cooling passages 32 after the cooling water flowing from the cooling passages 24, 27 are joined.

Accordingly, the battery parts 16, the first and second DE voltage converters 19, 20 and the electrical member 21 can be effectively and collectively cooled. In the heat exchanging structures of the first and second cooling units 14, 15 of this embodiment, each of heat generating members (e.g., battery parts 16, first and second DC voltage converters 19, 20 and the electrical member 21) is formed into a plate shape, and the cooling passages 24, 27, 32 are formed on both the surface sides of each heat generating member 16, 19-21 to cool each heat generating member 16, 19-21 from both the surface sides. That is, because a cooling structure which cools each plate-shaped heat generating member from the two surface sides is used for the plural heat generating members, heat transmitting area for cooling the heat generating members can be increased, and cooling performance of each heat generating member can be effectively increased.

Generally, control temperatures of the first and second voltage converters 19, 20 and the electrical member 21 are higher than a control temperature of the battery 16. Here, the control temperature of a heat generating member is an upper limit operation temperature for keeping a durability of the heat generating member during a predetermined using term. For example, the control temperature of the battery 16 is about 50° C., the control temperature of the first and second DC voltage converters 19, 20 is about 85-90° C., and the control temperature of the electrical member 21 is almost equal to the control temperature of the first and second DC voltage converters 19, 20.

Accordingly, in this embodiment, the cooling passages 24, 27 between the battery parts 16 are arranged upstream in the water flow of the first and second cooling units 14, 15, and the cooling passages 32 between the DC voltage converters 19, 20 and the electrical member 21 are arranged downstream in the water flow of the first and second cooling units 14, 15. Therefore, a temperature difference between the battery parts 16 and cooling water and a temperature difference between cooling water and the first and second DC current converters 19, 20 and the electrical member 21 can be greatly increased. As a result, the plural heat generating members having different control temperatures can be suitably effectively controlled within respective control temperatures.

Furthermore, the cooling waters having passed through a large number of the cooling passages 24, 27 of the battery parts 16 in parallel are joined, and the joined water flows into a small number of the cooling passages 32 of the DC voltage heat exchangers 19, 20 and the electrical member 21 in parallel. In addition, because the total passage sectional areas of the cooling passages 32 is made smaller than the total passage sectional areas of the cooling passages 24, 27, the flow rate of cooling water in the cooling passages 32 can be increased as compared with the flow rate of cooling water in the cooling passages 24, 27. Thus, in the cooling passage 32 downstream from the cooling passages 24, 27, heat transmitting efficiency can be improved due to a flow disturb of the cooling water.

At the same time, in the small number of the cooling passages 32, a flow amount of cooling water flowing through each cooling passage 32 can be increased as compared with the cooling passages 24, 27 of the battery parts 16. As a result, the DC voltage converters 19, 20 and the electrical member 21 having a relative high temperature can be effectively cooled.

According to the first embodiment, the different-kinds heat generating members, such as the battery parts 16, the DC voltage converters 19, 20 and the electrical member 21 are formed into plate shapes, e.g., rectangular plate shapes, and are laminated. Furthermore, the laminated plate-shaped heat generating members 16, 19-21 have the heat exchanging structure in which each of the plate-shaped heat exchanging members 16, 19-21 is cooled from both the face and back surfaces of each plate-shaped heat exchanging member. Therefore, the different-kinds heat exchanging members can be effectively cooled, and the size of the cooling structure for cooling the heat generating members can be effectively reduced.

Furthermore, a total planar plate surface area of two battery parts 16 arranged in series in the water flowing direction "a", a total planar plate surface area of two battery parts 16 arranged in series in the water flowing direction "b", each planar plate surface area of the DC voltage converters 19, 20 and each planar plate surface area of the electrical member 21 are set approximately equal. Therefore, all the volumes of both the cooling units 14, 15 can be set compactly while each of the heat generating members 16, 19-21 can be effectively cooled.

In this embodiment, to further reduce the dimensions of the cooling structure of the heat generating member, the plate thickness of the battery part 16 is set equal to or lower than 12 mm, the plate thickness of the DC voltage converter 19, 20 is set equal to or lower than 30 mm, and the plate thickness of the electrical member 21 is set equal to or lower than 50 mm.

In the example of FIG. 1, the cooling structure of the heat generating member is formed to be divided into the first and second cooling units 14, 15. However, the cooling structure of the heat generating member can be formed into a single member. For example, only the second cooling unit 15 can be provided, and the receiving spaces 55 for receiving the battery parts 16 can be increased in the second cooling unit 15. In this case, plural heat generating members (16, 19, 20, 21) to be cooled can be received in the single cooling unit 15.

Second Embodiment

Figure 4:
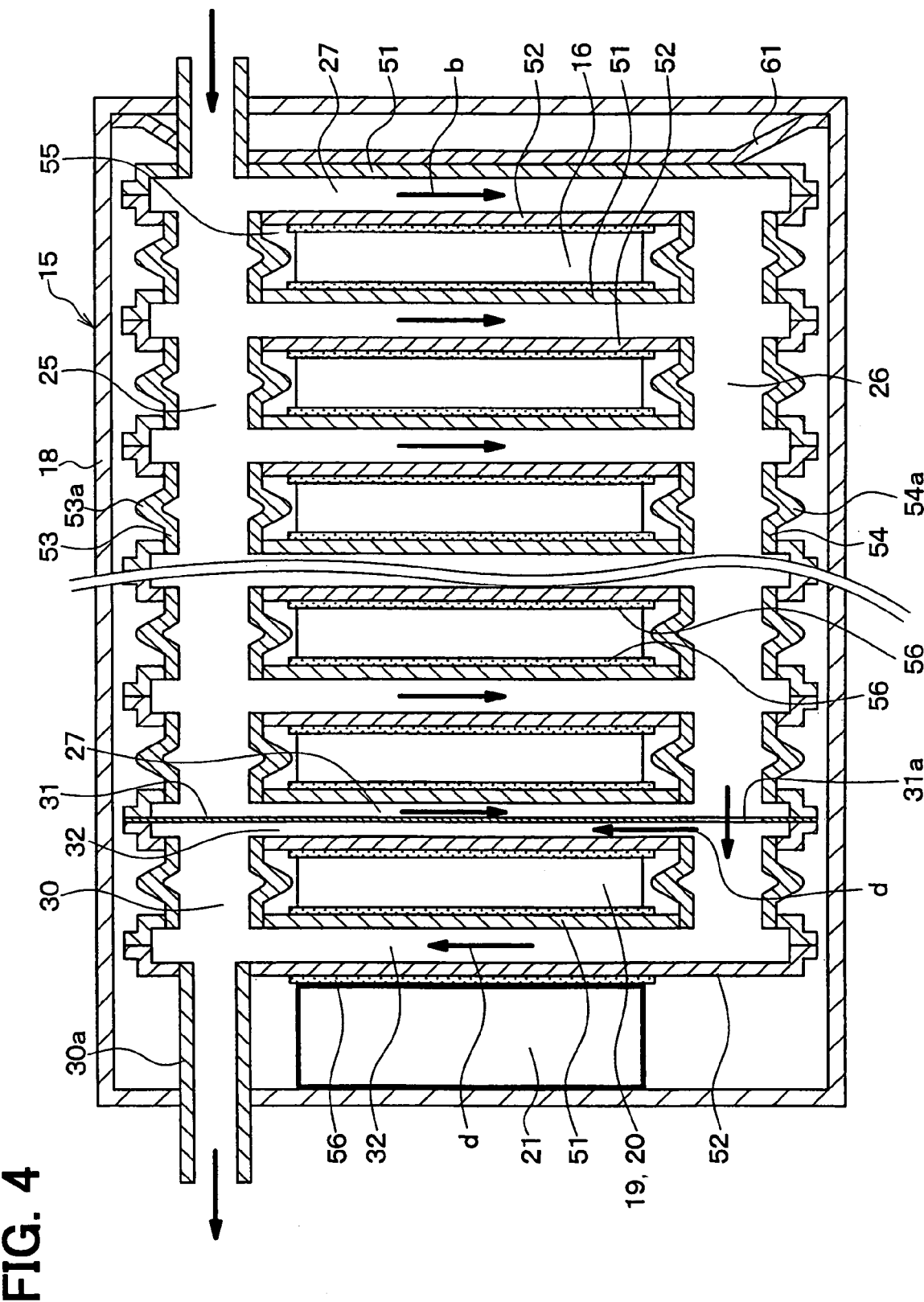
FIG. 4 is a sectional view showing a heat-exchanging part of a cooling unit for cooling heat generating members according to a second embodiment of the present invention.

The second embodiment of the present invention will be now described with reference to FIG. 4. In the second embodiment, a spring member 61 is located inside the case 18 so as to accurately press-contact each of the heat generating members (e.g., battery parts 16, DC voltage converters 19, 20, electrical member 21) and the heat exchanging plate member 51, 52. The cooling structure of the second embodiment is described by using the second cooling unit 15 described in the first embodiment. Furthermore, the parts of the second cooling unit 15 of FIG. 4, similar to those of the first embodiment, are indicated as the same reference numbers, and detail description thereof is omitted.

The spring member 61 is formed from a metal spring material, and is formed into a plate shape. As shown in FIG. 4, the spring member 61 is located between an inner wall surface of one end of the case 18 and one end portion of the heat exchanging plate members 51, 52 in the laminating direction. In contrast, the electrical member 21 is located between an inner wall surface of the other end of the case 18 and the other end portion of the heat exchanging plate members 51, 52 in the laminating direction. The case 18 is a rigid body, and can be formed from an electrical insulating material such as resin or can be formed from a metal material having an electrical insulating layer on its outer surface.

The spring member 61 is attached to the case 18 to be compressed between the heat exchanging plate member 51 and the inner wall surface of the one end portion of the case 18. Therefore, by using the elastic reaction (spring force) of the spring member 61, press-contacting between each of the heat generating members (16, 19, 20, 21) and the heat exchanging plate members 51, 52 can be further increased. Accordingly, heat transmitting amount between each heat generating members 16, 19-21 and the heat exchanging plate members 51, 52 can be effectively increased, thereby improving cooling performance of each of the heat generating members 16, 19-21.

In the second embodiment, only one side surface of the electrical member 21 press-contacts the heat exchanging plate member 52. Furthermore, a partition portion 31 for partitioning the inlet passage portion 25 and the outlet passage portion 30 from each other is formed from a metal plate bonded between a pair of the heat exchanging plate members 51, 52. The partition portion 31 has a communication hole 31a in the intermediate passage portion 26, through which cooling water passes through the intermediate passage portion 26 in the lamination direction.

In the second embodiment, the other parts can be made similarly to the above-described first embodiment. Therefore, cooling water flowing into the inlet passage portion 25 passes through the cooling passages 27 in parallel as in the water flowing direction "a" to cool the battery parts 16, and is joined to the intermediate passage portion 26. Then, the cooling water further flows through the communication hole 31a, and passes through the cooling passages 32 in parallel to cool the DC voltage converters 19, 20 and the electrical member 21. Thereafter, the cooling water flows out of the outlet passage portion 30.

Third Embodiment

Figure 5:
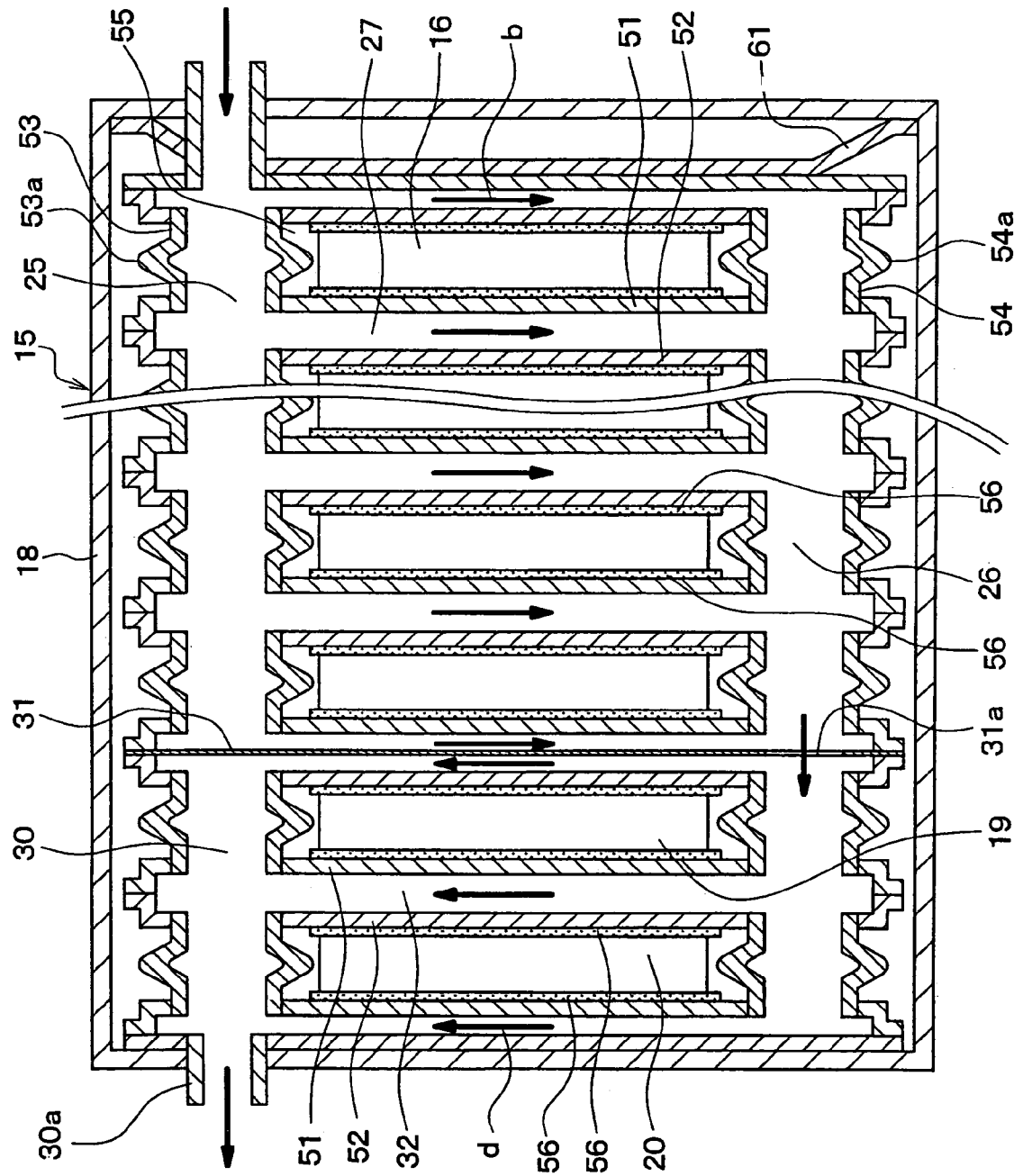
FIG. 5 is a sectional view showing a heat-exchanging portion of a cooling unit for cooling heat generating members according to a third embodiment of the present invention.

FIG. 5 shows the third embodiment that is a modification of the above-described second embodiment. In the third embodiment, the DC voltage converters 19, 20 are arranged in parallel on the side of the outlet passage portion 30 partitioned from the inlet passage portion 25, so that each of the DC voltage converters 19, 20 is cooled from both sides. In contrast, the electrical member 21 of the second embodiment is provided outside of the case 18. In the third embodiment, the other parts can be made similar to those of the above-described second embodiment.

Fourth Embodiment

Figure 6:
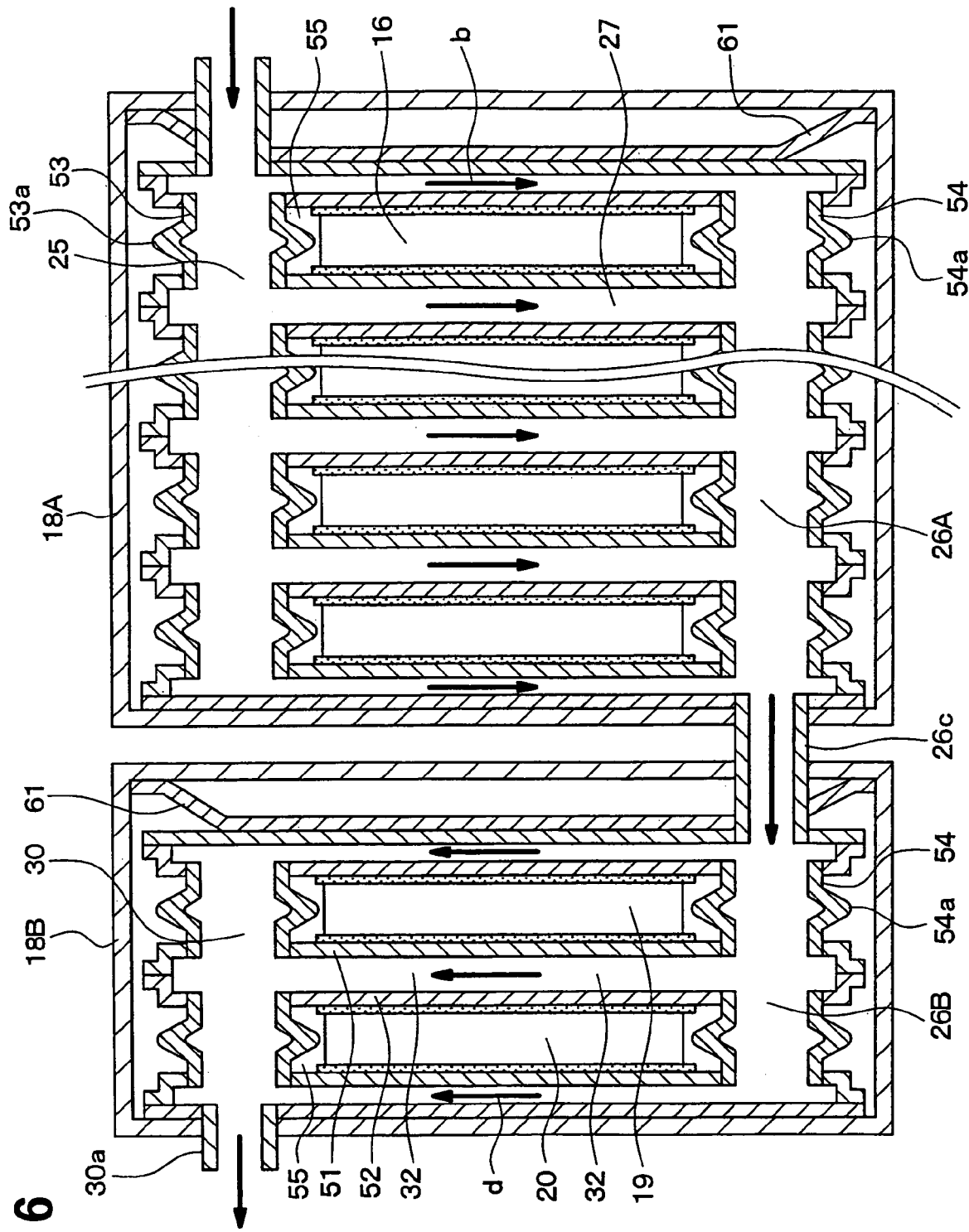
FIG. 6 is a sectional view showing a heat-exchanging portion of a cooling unit for cooling heat generating members according to a fourth embodiment of the present invention.

FIG. 6 shows the fourth embodiment of the present invention. In the fourth embodiment, the structure of the third embodiment shown in FIG. 5 is arranged within first and second case parts 18A, 18B. Specifically, a first heat exchanging structure for cooling the battery parts 16 is constructed within the first case part 18A, and a second heat exchanging structure for cooling the DC voltage converters 19, 20 is constructed within the second case part 18B. Furthermore, an outlet passage portion 26A into which the cooling water from the cooling passage 27 are joined is provided in the first case part 18A, and an inlet passage portion 26B communicating with the outlet passage portion 26A through a communication pipe 26C is provided in the second case part 18B. The cooling water from the outlet passage portion 26A flows into the inlet passage portion 26B through the communication pipe 26C, and passes through the cooling passages 32. Each of the first and second case parts 18A, 18B has the spring member 61, similarly to the above-described third embodiment. Furthermore, each of the first and second case parts 18A, 18B has a structure similar to that of the case 18, and communicate with each other through the communication pipe 26c.

Accordingly, cooling water flowing into the inlet passage portion 25 passes through the cooling passages 27 in parallel as in the water flowing direction "b", and is joined to the outlet passage portion 26A. The cooling water in the outlet passage portion 26A flows into the inlet passage portion 26B through the communication pipe 26C, and flows through the cooling passage 32 to be joined into the outlet passage portion 30.

Fifth Embodiment

In the above-described first to third embodiments, the DC voltage converters 19, 20 with a high control temperature and the battery parts 16 with a low control temperature are arranged adjacently in the same case 18. In this case, as shown by the arrow E in FIG. 7A, a thermal transmission from the DC voltage converters 19, 20 to the adjacent battery part 16 may be easily caused, thereby the temperature of the battery part 16 is increased.

In the fifth embodiment, as shown in FIG. 7B, a thermal insulating member 62 made of a thermal insulating material such as resin is located instead of the adjacent battery part 62, so as to restrict a heat transmission from the DC voltage converters 19, 20 having the high control temperature to the battery parts 16 having the low control temperature. In the fifth embodiment, the other parts can be formed similarly to any one of the above-described first to third embodiment.

Sixth Embodiment

In the above-described first embodiment, the electrical member 21 including the main relay is formed into a plate shape similarly to each of the DC voltage converters 19, 20, and the electrical member 21 and the DC voltage converters 19, 20 are arranged in parallel relative to the water flowing direction "b".

Figure 8:
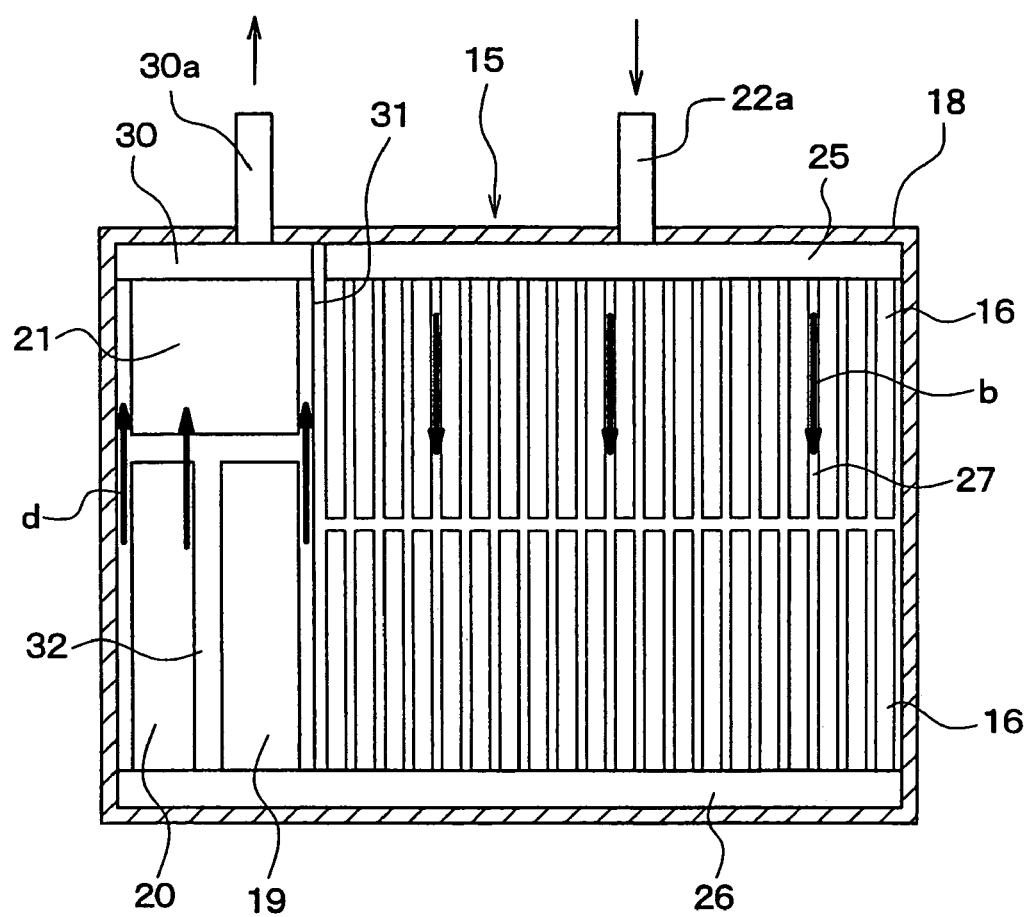
FIG. 8 is a schematic sectional view showing a cooling unit for cooling heat generating members according to a sixth embodiment of the present invention.

In contrast, in the sixth embodiment, the electrical member 21 is formed into a box shape, and is arranged downstream from the DC voltage converters 19, 20 in the water flowing direction, as shown in FIG. 8. Accordingly, in the cooling structure shown in FIG. 8, cooling water from the inlet pipe 22a flows into the inlet passage portion 25, passes through the cooling passages 27 as in the arrow "b", and is joined to the intermediate passage portion 26. Then, the cooling water in the intermediate passage portion 26 flows through the cooling passages 32 as in the arrow "d" in FIG. 8 to cool the DC voltage converters 19, 20 and the electrical member 21. Thereafter, the cooling water flowing into the outlet passage portion 30 is discharged through the outlet pipe 30a. In the above-described sixth embodiment, the battery parts 16 are arranged in two layers. However, the battery parts 16 can be arranged in one layer in the water flowing direction "b".

Seventh Embodiment

Figure 9:
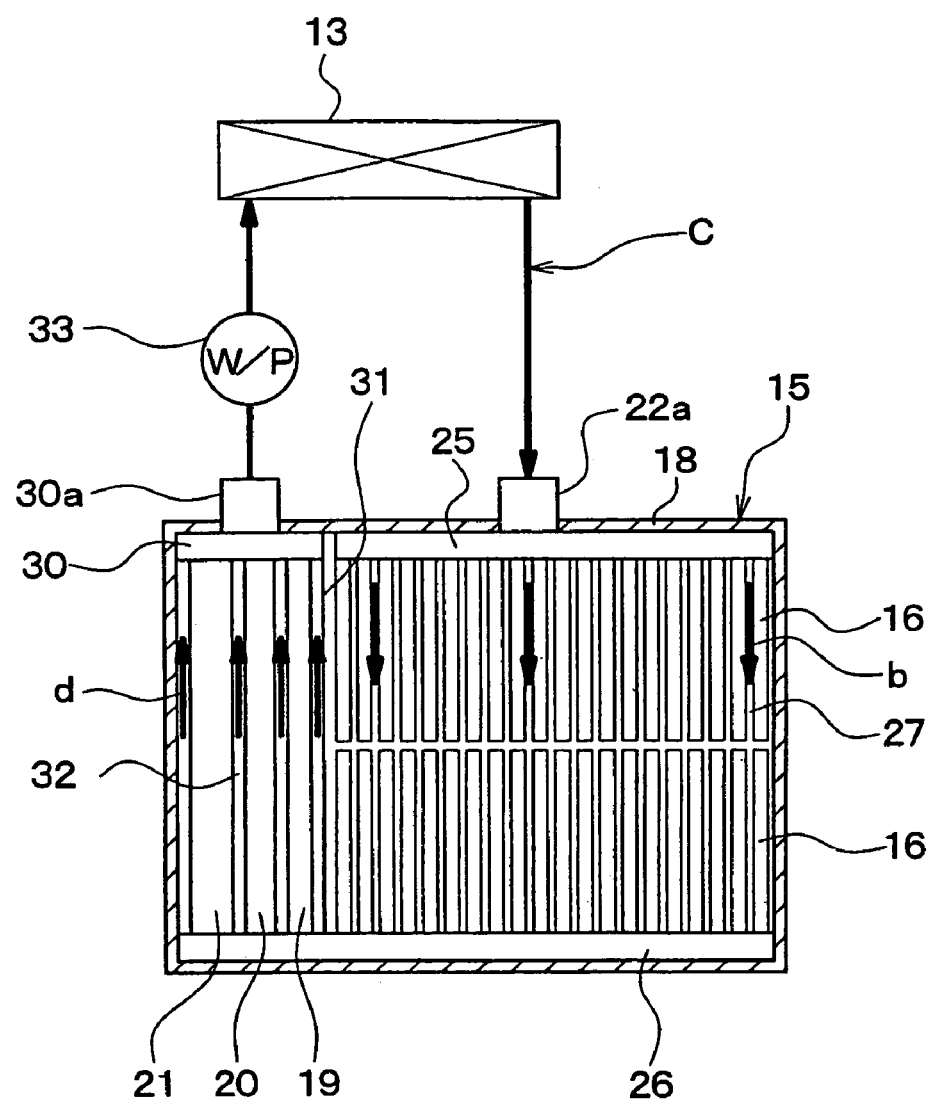
FIG. 9 is a schematic diagram showing a cooling water circuit of a cooling unit for cooling heat generating members according to a seventh embodiment of the present invention.

FIG. 9 shows a cooling structure of the seventh embodiment. In the seventh embodiment, the refrigerant cycle including the water-refrigerant heat exchanger 37 for cooling the cooling water using refrigerant is omitted, and only the radiator 13 for the heat generating members is used for cooling the cooling water. Furthermore, only a single cooling unit 15 is provided as shown in FIG. 9. That is, the cooling structure of the seventh embodiment is constructed with the radiator 13 and the cooling unit 15. Even in this case, the structure of the cooling unit 15 can be made similar to that of the second cooling unit 15 described in the first embodiment as shown in FIG. 9, or similarly to one of the second to sixth embodiment.

Eighth Embodiment

Figure 10:
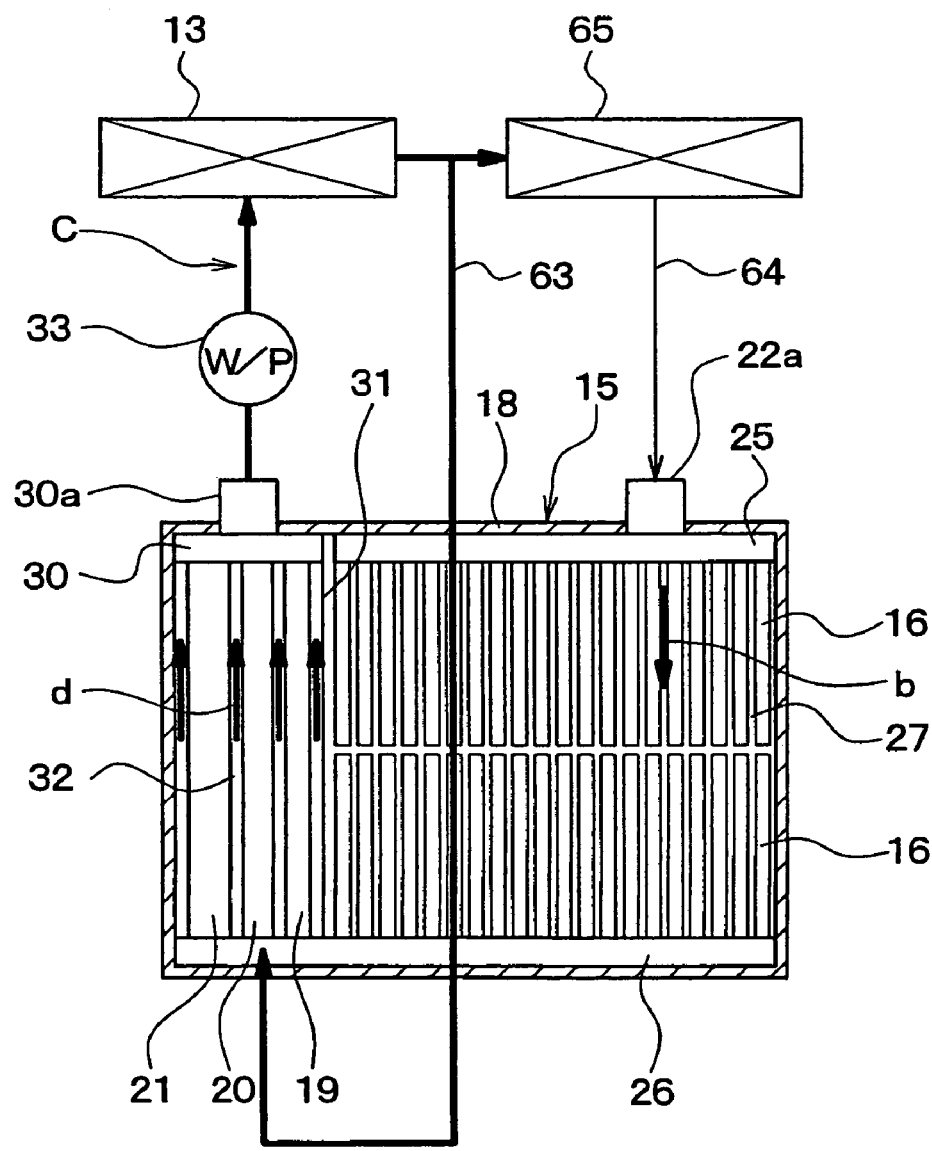
FIG. 10 is a schematic diagram showing a cooling water circuit of a cooling unit for cooling heat generating members according to an eighth embodiment of the present invention.

FIG. 10 shows a cooling structure of the eighth embodiment. The cooling structure of the eighth embodiment includes the radiator 13 used as a main radiator in which all the amount of cooling water flows, and a radiator 65 used as a supplementary radiator. That is, a downstream cooling passage of the radiator 13 is branched into a main cooling passage 63 and a supplementary cooling passage 64, and the radiator 65 is located in the supplementary cooling passage 65.

Accordingly, the battery parts 16 can be cooled using cooling water that is cooled in both the main radiator 13 and the supplementary radiator 65 to a low temperature. In contrast, the DC voltage converters 19, 20 and the electrical member 21 are cooled using a mixed water in which cooling water after passing through the cooling passages 27 between the battery parts 16 and cooling water from the main cooling passage 63 are mixed. That is, as shown in FIG. 10, the cooling water from the main cooling passage 63 flows into the intermediate cooling passage 26, and is joined with the cooling water after passing through the cooling passages 27. Thereafter, the mixed cooling water flows through the cooling passages 32 as in the arrows "d" in FIG. 10, and is discharged through the outlet pipe 30a in the cooling water circuit C.

Ninth Embodiment

Figure 11:
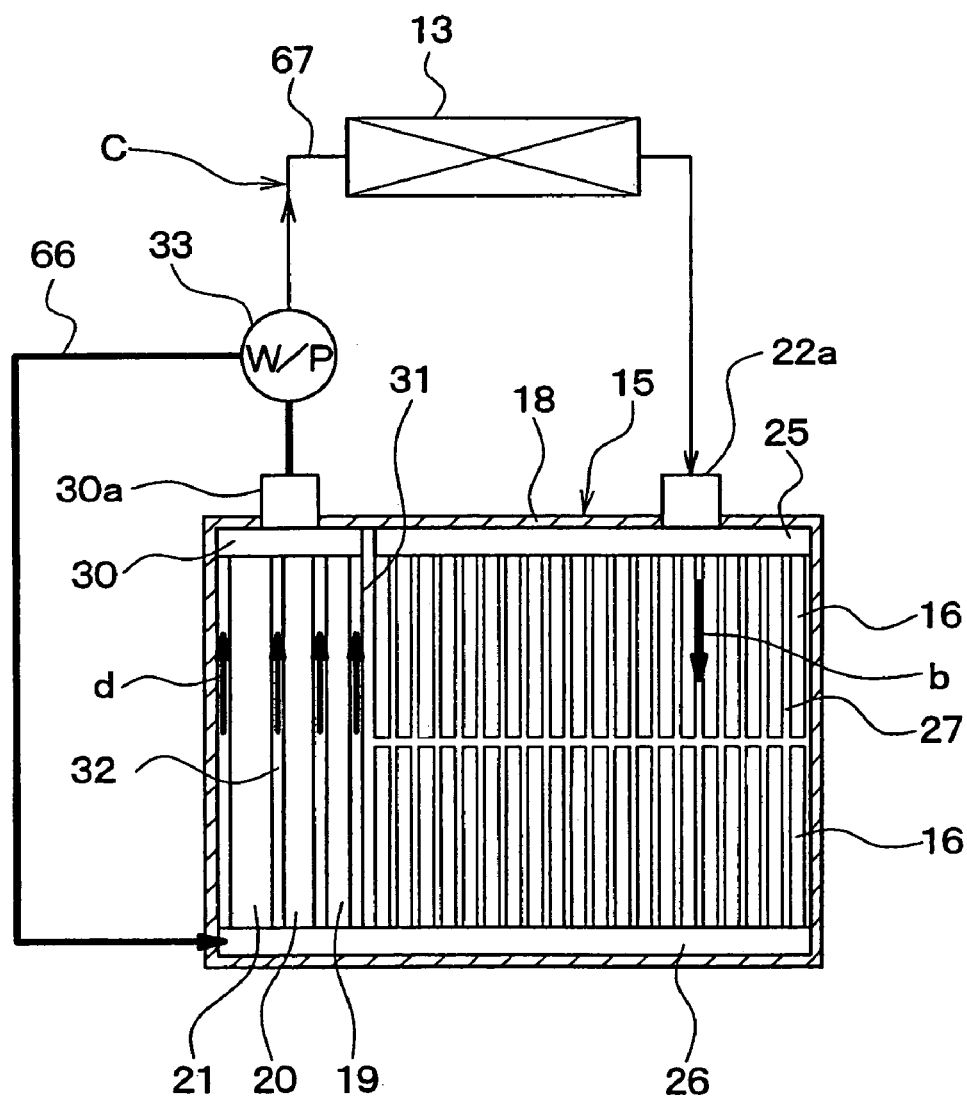
FIG. 11 is a schematic diagram showing a cooling water circuit of a cooling unit for cooling heat generating members according to a ninth embodiment of the present invention.

FIG. 11 shows a cooling structure of the ninth embodiment. In the ninth embodiment, a discharge cooling passage of the water pump 33 is branched into a main cooling passage 66 and a supplementary cooling passage 67, and the radiator 13 is located in the supplementary cooling passage 67. Therefore, the battery parts 16 are cooled by using cooling water cooled by the radiator 13.

In contrast, the DC voltage converters 19, 20 and the electrical member 21 are cooled by using mixed water in which the cooling water after passing through the cooling passages 27 and the cooling water from the main cooling passage 66 are mixed. Accordingly, similarly to the above-described eighth embodiment, the battery parts 16 can be cooled by using cooling water having a relative low temperature, and the DC voltage converters 19, 20 and the electrical member 21 can be cooled by using cooling water having a relative high temperature. Thereafter, all the heat generating members can be effectively cooled.

Tenth Embodiment

Figure 12:
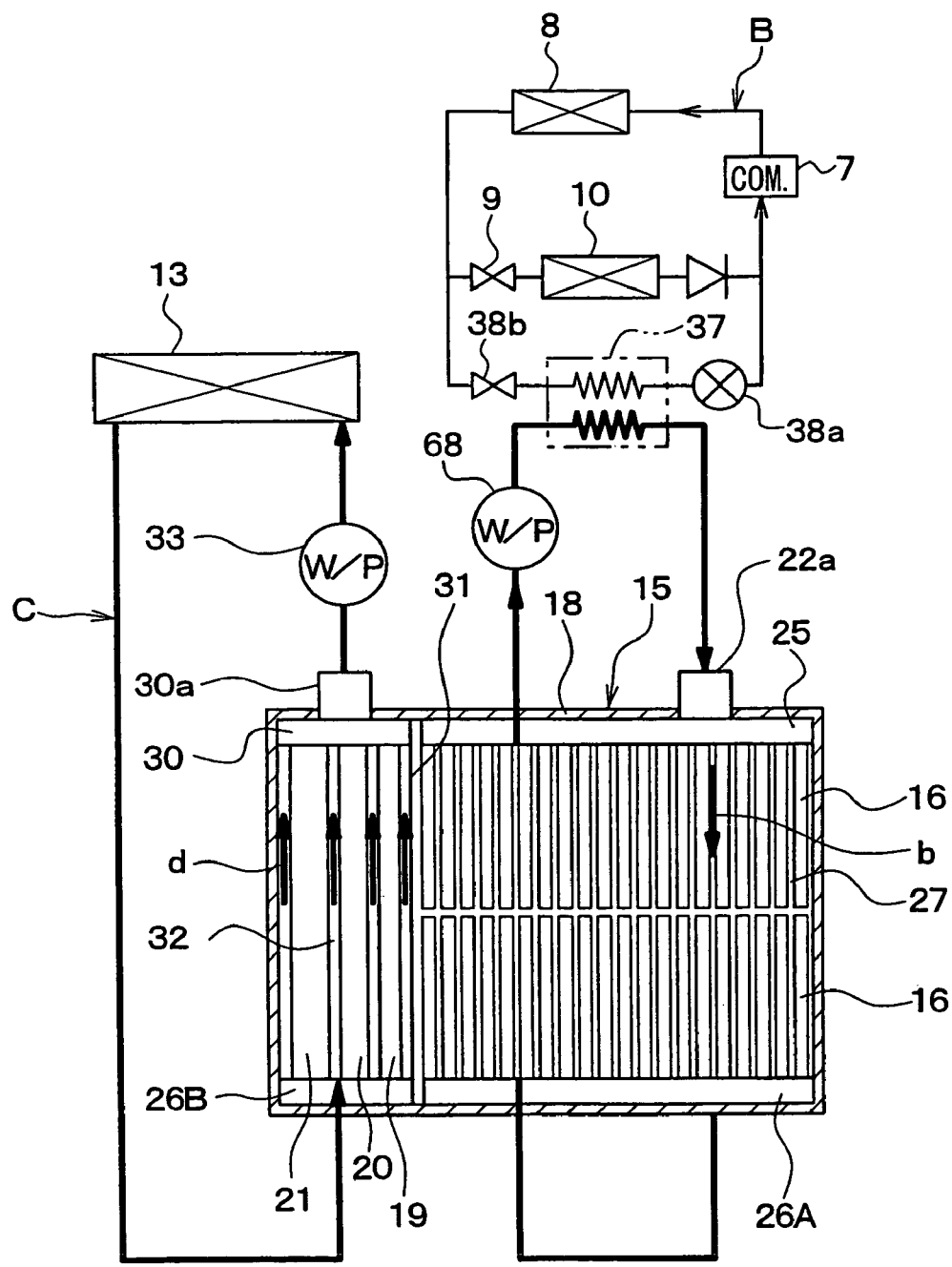
FIG. 12 is a schematic diagram showing a cooling water circuit of a cooling unit for cooling heat generating members according to a tenth embodiment of the present invention.

FIG. 12 shows a cooling structure of the tenth embodiment. In the tenth embodiment, a cooling unit 15 is constructed such that, the cooling water flowing through the cooling passages 27 on the side of the battery parts 16 is cooled by low-temperature refrigerant of the refrigerant cycle B described in the first embodiment, and cooling water flowing through the cooling passages 32 is cooled by the radiator 13.

Therefore, a partition portion 31 is disposed to partition from each other the inlet passage portion 25 of the cooling passages 27 for the battery parts 16 and the outlet passage portion 30 of the cooling passages 32 for the DC voltage converters 19, 20 and the electrical member 21. Furthermore, the partition portion 31 is disposed to partition from each other the outlet passage portion 26A of the cooling passages 27 for the battery parts 16 and the inlet passage portion 26B of the cooling passages 32 for the DC voltage converters 19, 20 and the electrical member 21.

Accordingly, cooling water pumped by the water pump 33 is cooled in the radiator 13, and passes through the cooling passages 32 as in the water flow direction "d" so as to cool the DC voltage converters 19, 20 and the electrical member 21. In contract, cooling water pumped by a water pump 68 is cooled in the water-refrigerant heat exchanger 37 and flows through the cooling passages 27 so as to cool the battery parts 16.

In the refrigerant cycle B of the tenth embodiment, the electromagnetic valve 38a of the valve device 38 is arranged at a downstream side of the water-refrigerant heat exchanger 37 in a refrigerant flow direction separately from the decompression unit 38b. Even in the tenth embodiment, the battery parts 16 can be arranged in one layer to have a plate surface area approximately equal to that of the heat generating members 19-21.

Eleventh Embodiment

Figure 13:
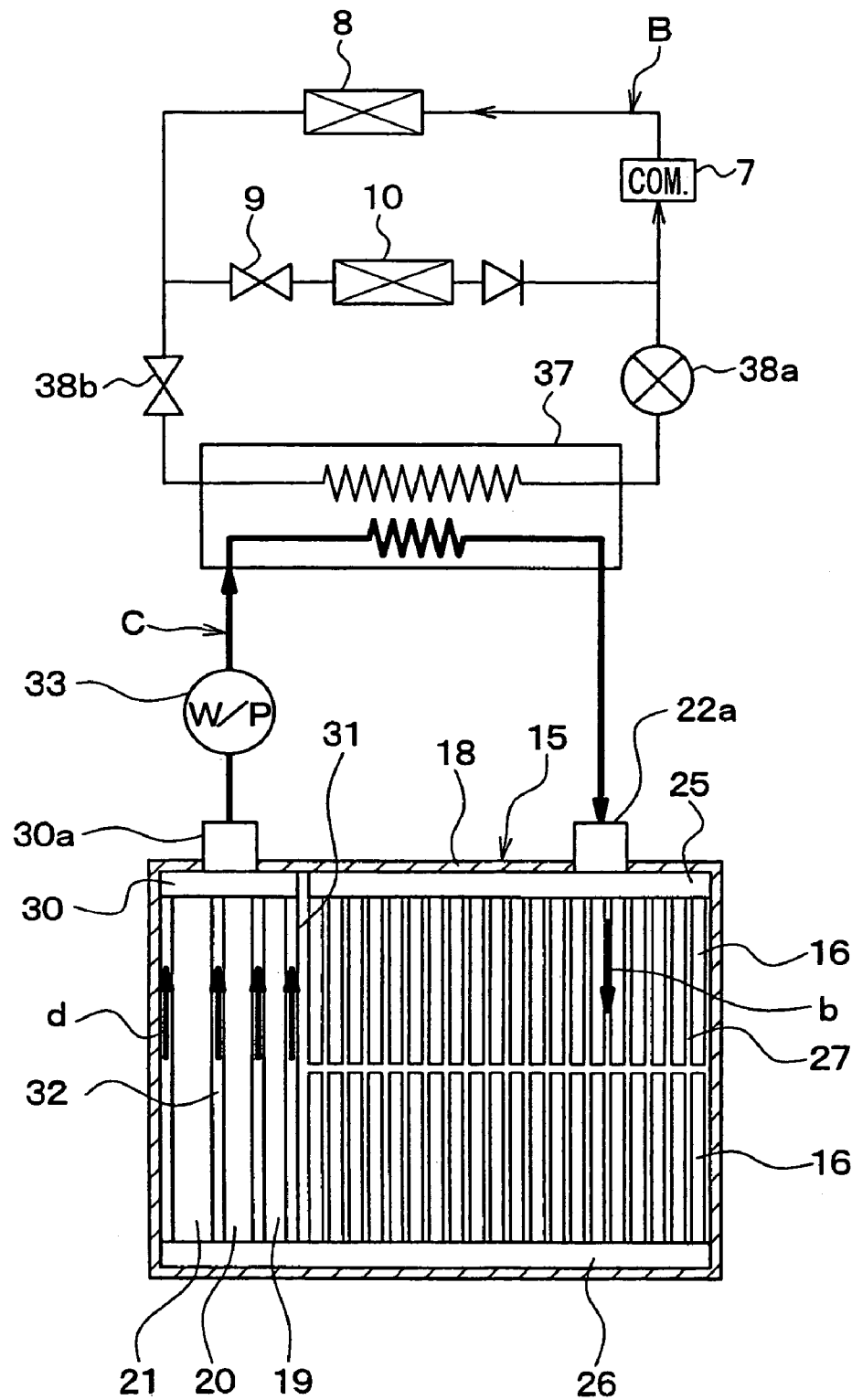
FIG. 13 is a schematic diagram showing a cooling water circuit of a cooling unit for cooling heat generating members according to an eleventh embodiment of the present invention.

FIG. 13 shows a cooling structure of the eleventh embodiment. In the cooling unit 15 of the eleventh embodiment, all cooling water for cooling the battery parts 16, the DC voltage converters 19, 20 and the electrical member 21 are cooled by using cooling water that is cooled in the water-refrigerant heat exchanger 37 of the refrigerant cycle B.

In this case, the partition member 31 only partitions the inlet passage portion 25 and the outlet passage portion 30, while the intermediate passage portion 26 communicates with both the cooling passages 27 and the cooling passages 31. In this case, the radiator 13 is disused for cooling the heat generating members.

Twelfth Embodiment

Figure 14:
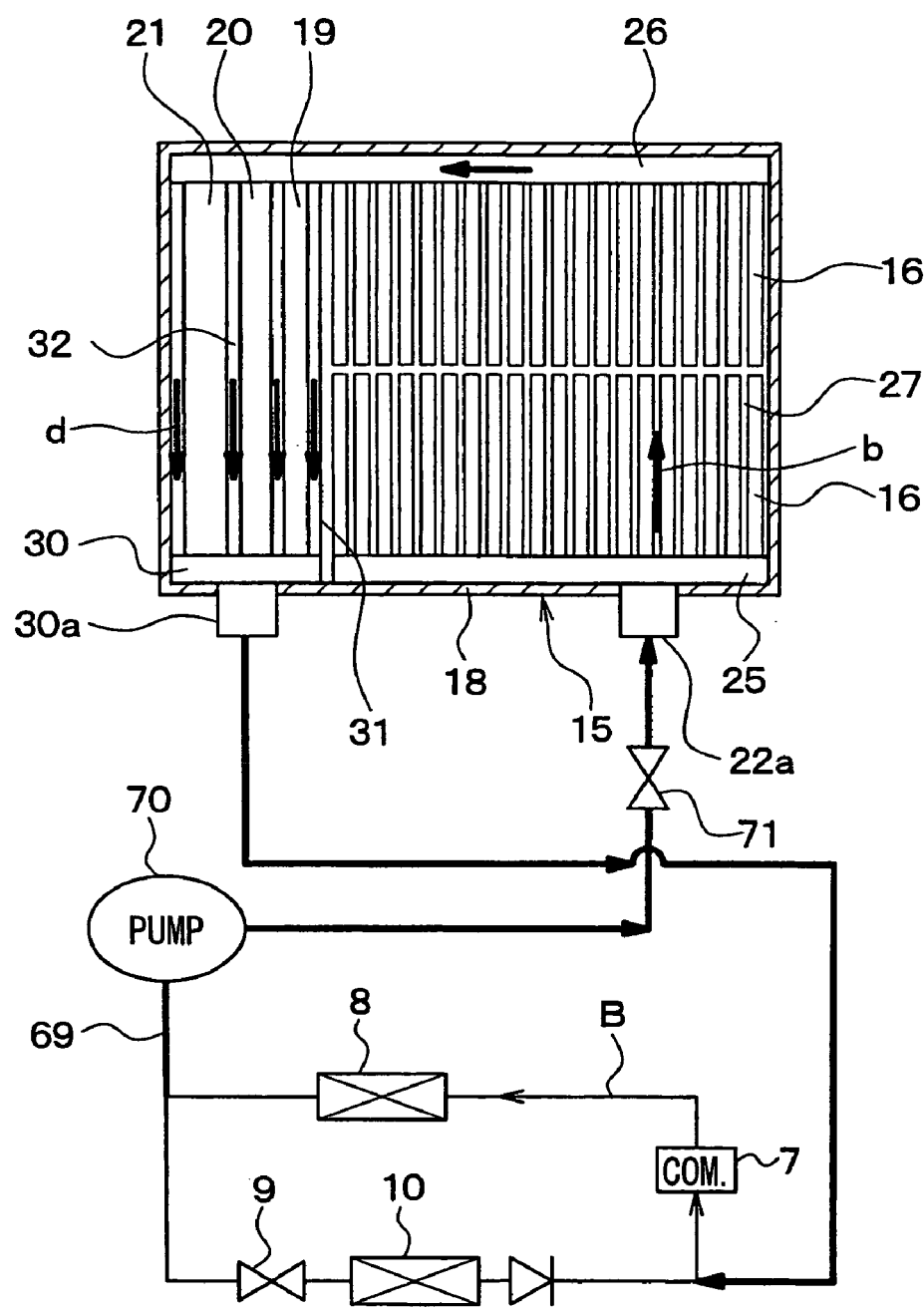
FIG. 14 is a schematic diagram showing a cooling water circuit of a cooling unit for cooling heat generating members according to a twelfth embodiment of the present invention.

FIG. 14 shows a cooling structure of the twelfth embodiment. In the twelfth embodiment, the structure of the cooling unit 16 can be made similar to that of the cooling unit 16 described in the above embodiments, in which the cooling water flows into the cooling unit 15 as a cooling fluid. However, in the twelfth embodiment, a branch refrigerant passage 69 branched from a refrigerant outlet side of the condenser 8 and joined to a refrigerant suction side of the compressor 7 is provided. Furthermore, a liquid refrigerant pump 70 for sending high-pressure refrigerant, a decompression unit 71 for decompressing the high-pressure refrigerant from the refrigerant pump 70 and the cooling unit 15 are arranged in series, so that refrigerant directly flows into the cooling passages 27 and the cooling passages 32. Therefore, the battery parts 16, the DC voltage converters 19, 20 and the electrical member 21 are cooled by the refrigerant directly flowing through the cooling passages 27, 32.

Thirteenth Embodiment

Figure 15:
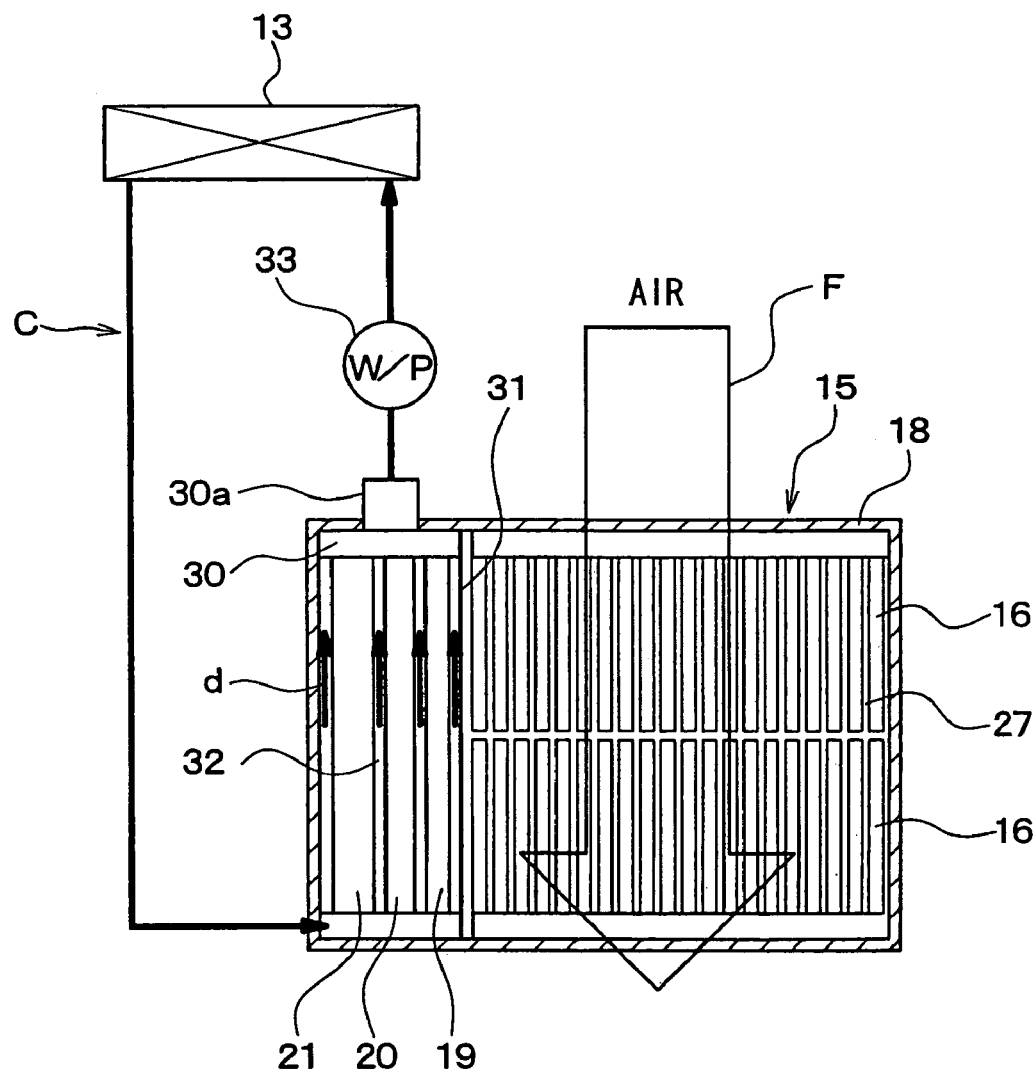
FIG. 15 is a schematic diagram showing a cooling water circuit of a cooling unit for cooling heat generating members according to a thirteenth embodiment of the present invention.

FIG. 15 shows a cooling structure of the thirteenth embodiment. In this embodiment, the DC voltage converters 19, 20 and the electrical member 21 are cooled by the cooling water from the radiator 13 while the battery parts 16 are further cooled by air.

For example, an air-cooled part of the cooling unit 15, including the battery parts 16 and the cooling passages 27, is arranged so that air F inside a passenger compartment is blown to the air-cooled part of the cooling unit 15. For example, the cooling passages 27 are provided in the cooling unit 15 so that air passes through the cooling passages 27. In contrast, cooling water flows through the cooling passages 32 so as to cool the DC voltage converters 19, 20 and the electrical member 21. In the thirteenth embodiment, it is also possible to cool the battery parts 16 using the cooling water from the radiator 13, while the DC voltage converters 19, 20 and the electrical member 21 are cooled by air.

Fourteenth Embodiment

Figure 16:
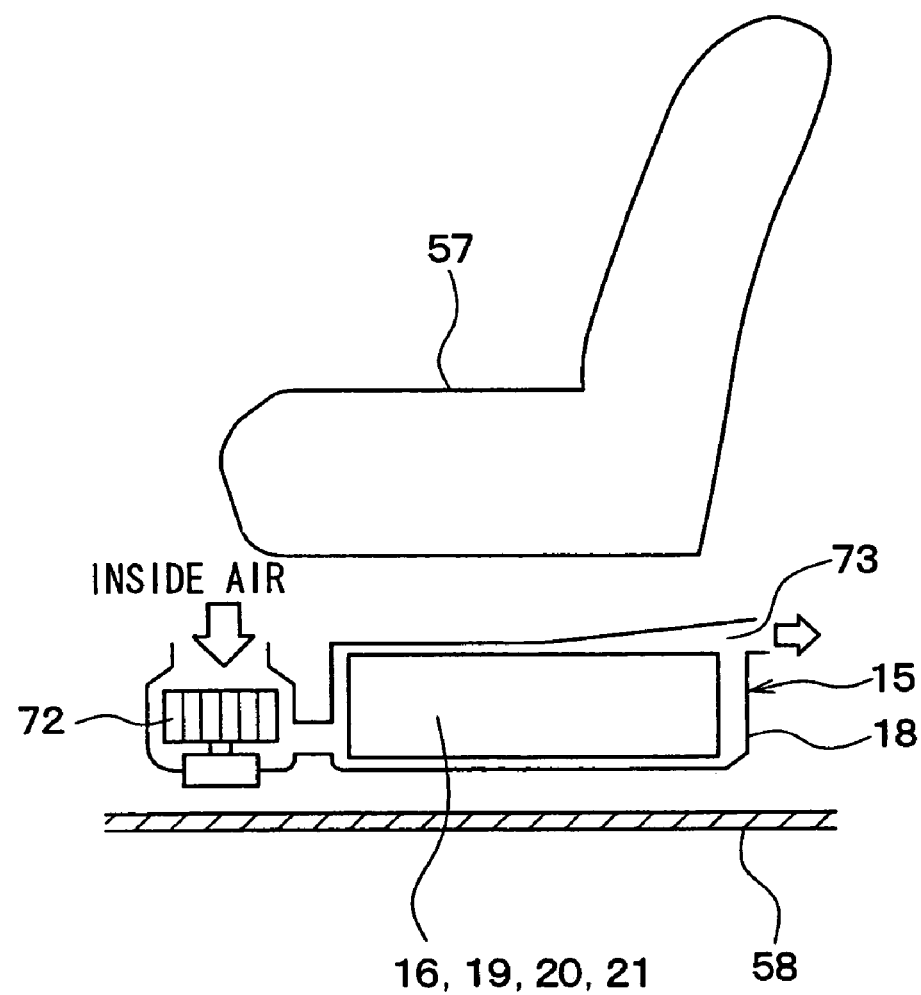
FIG. 16 is a schematic diagram showing a mounting structure of a cooling unit for cooling heat generating members according to a fourteenth embodiment of the present invention.

FIG. 16 shows a cooling structure of the fourteenth embodiment. In the fourteenth embodiment, all cooling unit 15 is an air-cooled unit constructed to cool the battery parts 16, the DC voltage converters 19, 20 and the electrical member 21 by using air. An electrical blower 72 is disposed to draw air (inside air) inside the passenger compartment, and to blow the drawn air into the case 18 of the cooling unit 15 so that all the battery parts 16, the DC voltage converters 19, 20 and the electrical member 21 are cooled by air. Air after passing through the cooling unit 15 is returned to the passenger compartment from an air outlet 73. The air after passing through the cooling unit 15 can be discharged to a space (e.g., an exterior of the passenger compartment) under a floor plate 58. In the fourteenth embodiment, the cooling passages 27, 32 can be provided so that air passes through the cooling passages 27, 32. Even in this case, the structure of the cooling unit 15 can be made similarly to one of the above-described embodiments.

Fifteenth Embodiment

Figure 17:
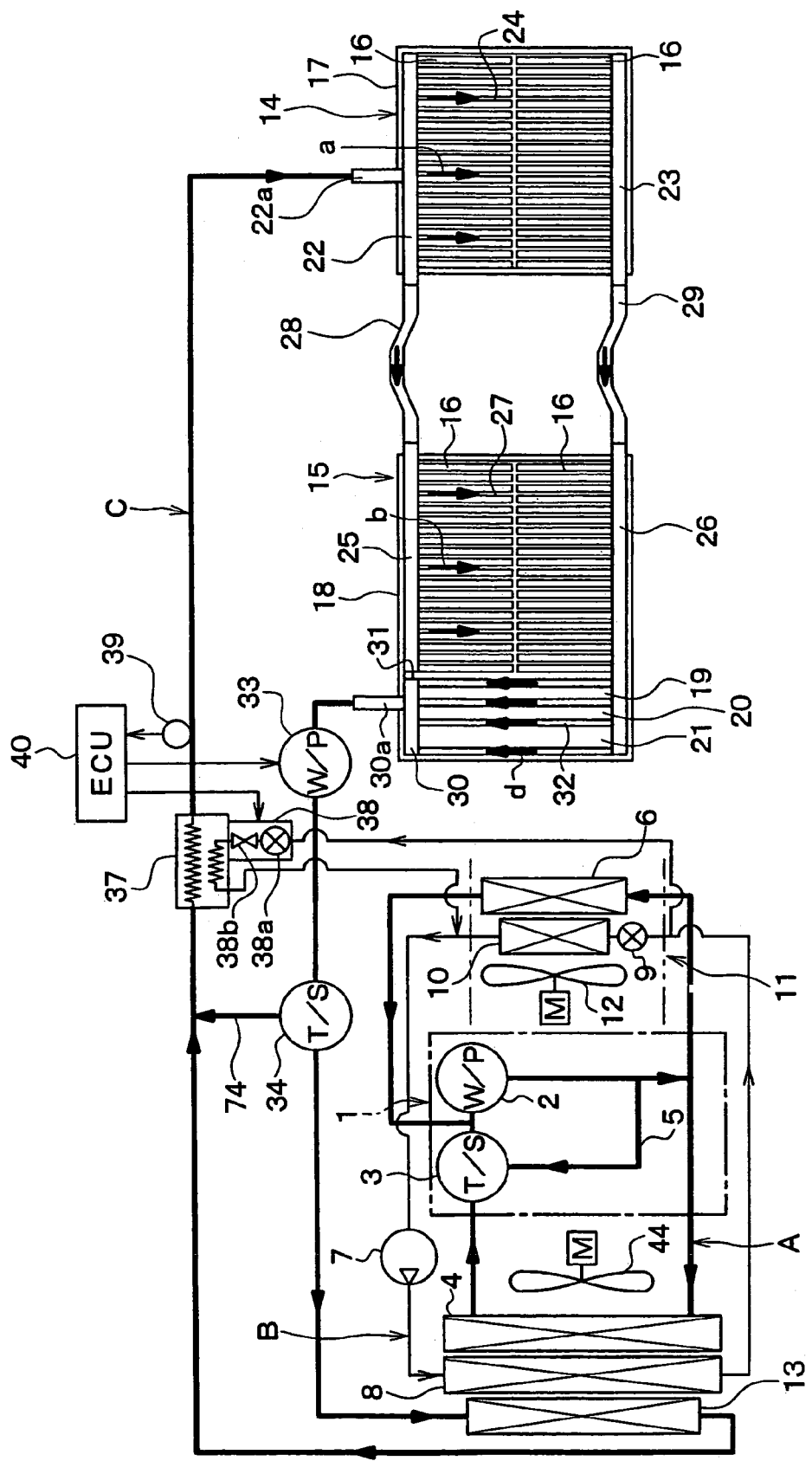
FIG. 17 is a schematic diagram showing an entire system according to a fifteenth embodiment of the present invention.

FIG. 17 shows a cooling structure of the fifteenth embodiment. In the fifteenth embodiment, when outside air temperature is low, the battery parts 16 can be heated using a heat generating amount from the DC voltage converters 19, 20 and the electrical member 21.

As shown in FIG. 17, a bypass passage 74 through which the cooling water flows in parallel with the radiator 13 is provided, and a thermostat 34 for switching the bypass passage 74 is provided. The thermostat 34 is constructed so that cooling water from the water pump 33 always circulates in the cooling water circuit C for the heat generating member. Simultaneously, the bypass passage 74 is opened by the thermostat 34 until the temperature of the cooling water increases to a predetermined temperature (e.g., 40° C.). Because the bypass passage 74 is opened, the cooling water heated by the DC voltage converters 19, 20 and the electrical member 21 can be directly returned to the inlet side of the cooling units 14, 15 to heat the battery parts 16. When the bypass passage 74 is opened, only a little of cooling water flows into the radiator 13.

When the water temperature at the thermostat 34 is increased to the predetermined temperature, the thermostat 34 closes the bypass passage 74, so that all cooling water passes through the radiator 13 and is cooled by the radiator 13.

In the cooling structure of the fifteenth embodiment, the other parts indicated by the same reference numbers as in those of the cooling structure in FIG. 1 have the same functions as those of the cooling structure in FIG. 1.

Sixteenth Embodiment

Figure 18:
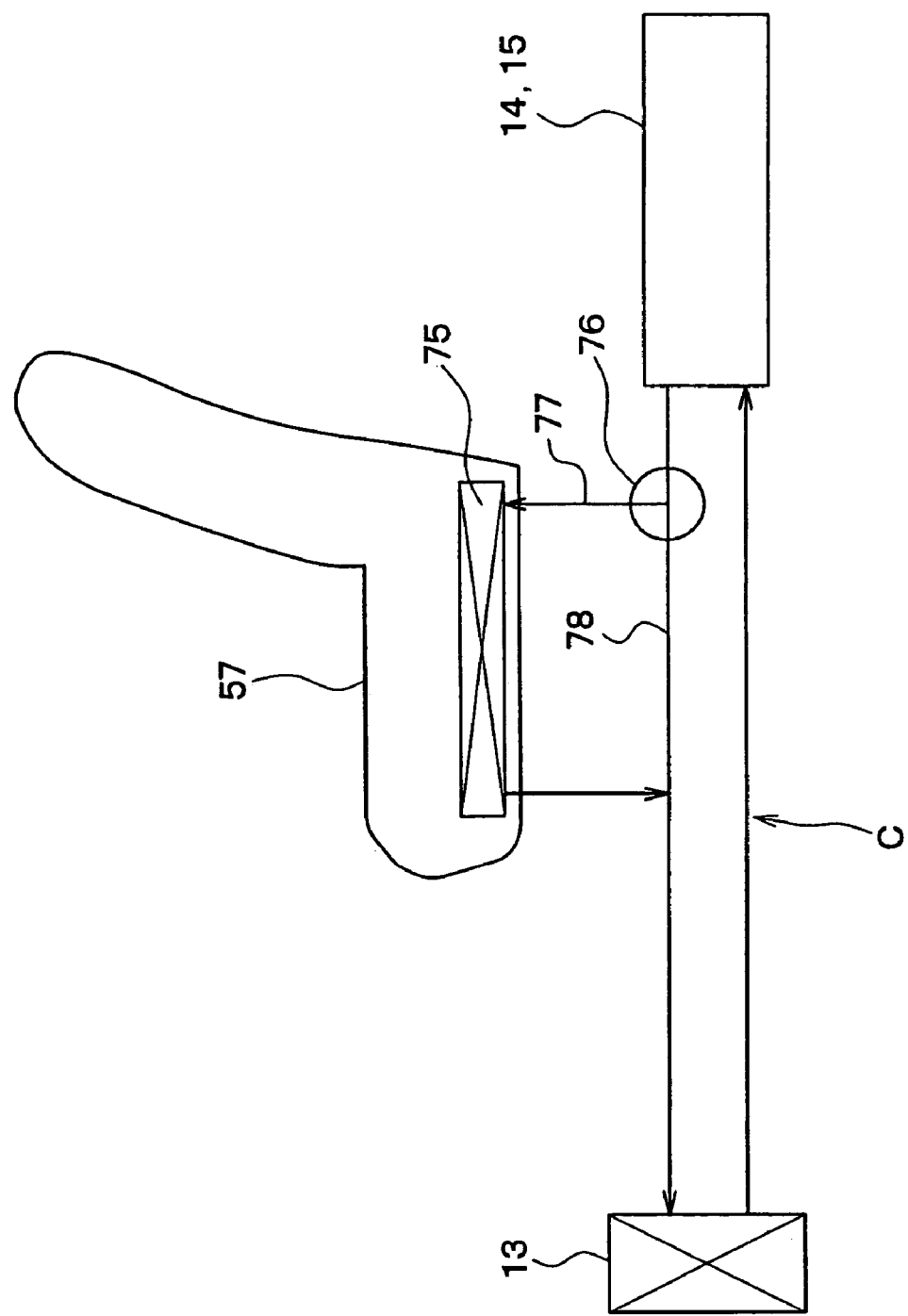
FIG. 18 is a schematic diagram showing a mounting structure of a cooling unit for cooling heat generating members according to a sixteenth embodiment of the present invention.

FIG. 18 shows the sixteenth embodiment. In the sixteenth embodiment, heat generated from heat generating members such as the battery parts 16, the DC voltage converters 19, 20 and the electrical member 21 is used for heating a seat 57 of a vehicle.

As shown in FIG. 18, a radiator 75 for heating a seat 57 using the cooling water (hot water) from the cooling units 14, 15 is located at an outlet side of the cooling units 14, 15 via a switching valve 76.

When a seat heating operation for heating the seat 57 is performed, a passage 77 branched from a main passage 78 of the cooling water circuit C for the heat generating members is opened by the switching valve 76, and the main passage 78 of the cooling water circuit C is closed. In this case, high temperature water from the outlet side of the cooling units 14, 15 is introduced into the radiator 75 so as to heat the seat 57 using the cooling water (hot water) as a heating source.

In this embodiment, the radiator 75 can be arranged to directly heat the seat 57 or can be arranged to heat air to be blown from holes of a seat surface of the seat 57.

Seventeenth Embodiment

Figure 19:
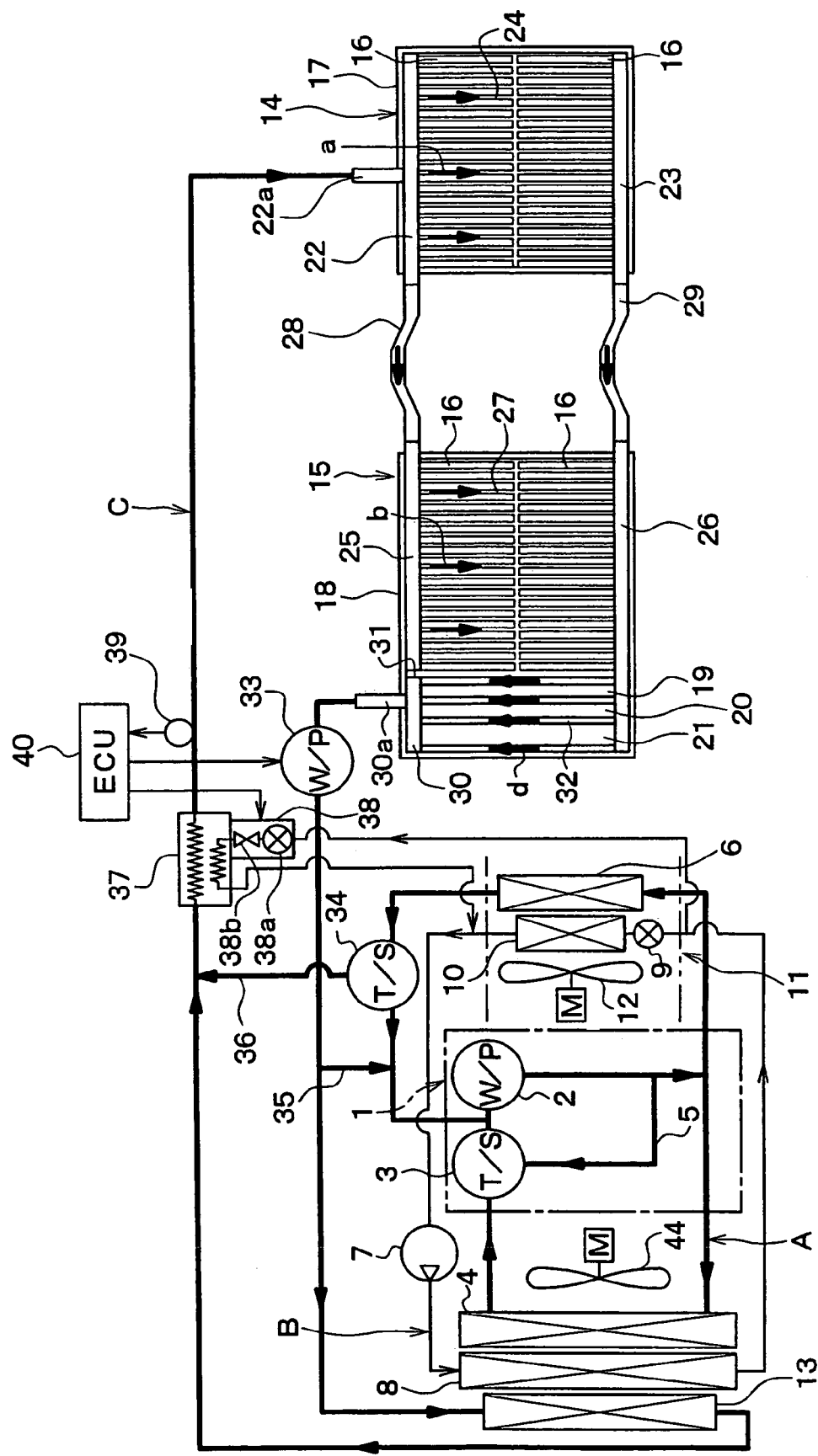
FIG. 19 is a schematic diagram showing an entire system according to a seventeenth embodiment of the present invention.

FIG. 19 shows a cooling structure of the seventeenth embodiment. In the seventeenth embodiment, the thermostat 34 described in the above first embodiment is arranged at an outlet side of the heater core 6 in the engine cooling water circuit A.

In the seventeenth embodiment, the thermostat 34 opens the communication passage 36 until the cooling water temperature at the outlet side of the heater core 6 is increased to a predetermined temperature (e.g., 40-50° C.) so that the outlet side of the heater core 6 communicates with the communication passage 36.

When the cooling water temperature at the outlet side of the heater core 6 is increased to the predetermined temperature, the valve body of the thermostat 34 closes the communication passage 36 so that the outlet side of the heater core 6 communicates with the water suction side of the water pump 2.

Furthermore, an outlet side of the water pump 33 of the cooling water circuit C is connected to an outlet side of the thermostat 34 of the engine cooling water circuit A by a communication passage 35.

According to the seventeenth embodiment, until the cooling water temperature of the heater core 6 is increased to the predetermined temperature (e.g., 40-50° C.), the thermostat 34 opens the communication passage 36. In this case, the cooling water in the cooling water circuit C flows in this order of the outlet side of the water pump 33→the communication passage 35→the water, pump 2 of the engine cooling water circuit A→the engine 1→the heater core 6→the thermostat 34→the communication passage 36→the water-refrigerant heat exchanger 37→the first and second cooling units 14, 15→the suction side of the water pump 33. Therefore, the temperature of cooling water is increased by absorbing heat in the first and second cooling units 14, 15, and the cooling water after being temperature-increased flows into the suction side of the water pump 2 of the engine cooling water circuit A.

Thus, the cooling water of the engine cooling water circuit A and the cooling water of the cooling water circuit C for the heat generating member are mixed so as to facilitate an increase of the cooling water temperature in the engine cooling water circuit A. As a result, at a cold condition in the winter, the heating of the vehicle engine 1 can be facilitated, and heating effects for heating the passenger compartment due to the heater core 6 can be facilitated.

In the cooling structure of the seventeenth embodiment, the other parts indicated by the same reference numbers as in those of the cooling structure in FIG. 1 have the same functions as those of the cooling structure in FIG. 1.

Other Embodiments

Although the present invention has been described in connection with some preferred embodiments thereof with reference to the accompanying drawings, it is to be noted that various changes and modifications will become apparent to those skilled in the art.

For example, in the above-described first embodiment, the cooling passages 24, 27 are provided between adjacent battery parts 16. However, the cooling passage 24, 27 can be arranged only at end portions of the battery parts 16 in the laminating direction. In the above-described embodiments, the battery parts 16, the DC voltage converters 19, 20 and the electrical member 21 are combined as the multiple heat generating members. However, only the DC voltage converters 19, 20 and the electrical member 21 can be combined as the multiple heat generating members.

In the above-described embodiments, the cooling units 14, 15 can be mounted under a front-passenger's seat of the vehicle when the capacity of the battery is small, and can be mounted under both a driver's seat and the front-passenger's seat of the vehicle when the capacity of the battery is large.

In the above-described embodiments, water, refrigerant or/and air is used as the cooling fluid flowing through the cooling passages 24, 27, 32 of the cooling units 14, 15. However, the other cooling fluid such as an oil can be used in the cooling units 14, 15.

In the above-described first embodiment, even in a condition where air conditioner is not operated and the compressor 7 of the refrigerant cycle B is stopped, the compressor 7 can be forcibly operated so that cooling water can be quickly cooled by low-temperature refrigerant in the water-refrigerant heat exchanger 37.

Furthermore, the thermostat 34 described above is constructed by a thermal-responding valve operated based on the cooling water temperature. However, the thermostat 34 can be constructed by an electrical valve electrically operated in accordance with the cooling water temperature.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A cooling structure for a device mounted to a vehicle, the cooling structure comprising:
   a plurality of heat generating members, each of the plurality of heat generating members having a plate shape, wherein
   the heat generating members are arranged in a plate-thickness direction to have predetermined spaces between adjacent heat generating members for forming fluid passages, each fluid passage being disposed between the adjacent heat generating members;
   the fluid passages pass a fluid for cooling the heat generating members;
   the plurality of heat generating members include a plurality of first members and a plurality of second members, the plurality of second members having a control temperature higher than a control temperature of the plurality of first members;
   the fluid passages include a plurality of first passages disposed between adjacent first members and a plurality of second passages disposed between adjacent second members;
   a total number of the plurality of second passages is smaller than a total number of the plurality of first passages;
   all fluid having passed through the plurality of first passages flows through the plurality of second passages; and
   a total passage sectional area of the plurality of second passages between the adjacent second members is smaller than a total passage sectional area of the plurality of first passages between the adjacent first members.

2. The cooling structure according to claim 1, further comprising
   a case in which all the heat generating members are accommodated.

3. The cooling structure according to claim 1, wherein:
   the heat generating members include at least first and second different heat generating members which have approximately equal plate surfaces.

4. The cooling structure according to claim 1, wherein:
   the heat generating members include at least a first heat generating member operated to be lower than a first control temperature, and a second heat generating member operated to be lower than a second control temperature higher than the first control temperature.

5. The cooling structure according to claim 4, further comprising
   a thermal insulating member arranged between the first heat generating member and the second heat generating member.

6. The cooling structure according to claim 4, wherein the second heat generating member is arranged downstream from the first heat generating member in a flow direction of the fluid.

7. The cooling structure according to claim 4, wherein the first heat generating member is a battery part, the second heat generating member is a DC voltage converter, and the fluid is water.

8. The cooling structure according to claim 7, further comprising
   a radiator which is disposed to heat a seat of the vehicle using water from the fluid passages as a heat source.

9. The cooling structure according to claim 4, wherein the first heat generating member is a battery part, the second heat generating member is a DC voltage converter, and the fluid is air.

10. The cooling structure according to claim 9, wherein the fluid is air inside a passenger compartment of a vehicle.

11. The cooling structure according to claim 4, wherein the fluid is water, the cooling structure further comprising
    means for switching fluid passages such that water, heated by the first heat generating member and the second heat generating member to a predetermined temperature, flows into an engine cooling water circuit for cooling a vehicle engine.

12. The cooling structure according to claim 4, wherein the fluid is water, the cooling structure further comprising
    means for switching fluid passages such that water heated by the second heat generating member directly returns to the first heat generating member.

13. The cooling structure according to claim 1, wherein:
    the plurality of first members operate to be lower than a first control temperature, and the plurality of second members operate to be lower than a second control temperature higher than the first control temperature.

14. The cooling structure according to claim 1, wherein the plurality of first members operate to be lower than a first control temperature, and the plurality of second members operate to be lower than a second control temperature higher than the first control temperature, the cooling structure further comprising
    means for setting a flow speed of the fluid in the plurality of second passages between the second members to be higher than a flow speed of the fluid in the plurality of first passages between the first members.

15. The cooling structure according to claim 14, wherein the second members are arranged downstream from the first members in a flow direction of the fluid.

16. The cooling structure according to claim 14, wherein a total passage sectional area of the plurality of second passages between the second members is smaller than a total passage sectional area of the plurality of first passages between the first members.

17. The cooling structure according to claim 1, wherein the fluid flowing through the fluid passages is water, the cooling structure further comprising
    at least one of a radiator arranged in a water circuit, for cooling the water flowing to the fluid passage by performing heat exchange with air, and a water-refrigerant heat exchanger for cooling water flowing to the fluid passages by performing heat exchange with refrigerant in a refrigerant cycle.

18. The cooling structure according to claim 1, further comprising a case for accommodating the heat generating members, wherein the case is located under a seat of the vehicle.

19. The cooling structure according to claim 1, wherein:
    the heat generating members are stacked and accommodated in one case, the cooling structure further comprising first and second fluid passage portions provided at two end sides of the first and second passages to extend in a stacking direction of the heat generating members, and the first and second members are disposed between the first and second passage portions.

20. The cooling structure according to claim 1, wherein: the first and second passages are configured such that a flow amount of the fluid flowing through each second passage is larger than a flow amount of the fluid flowing through each first passage.

21. The cooling structure according to claim 1, wherein each of the fluid passages is disposed between opposing surfaces of the adjacent heat generating members and the fluid passages pass the fluid along an entire length of the opposing surfaces of the adjacent heat generating members.

22. The cooling structure according to claim 1, wherein:
the plurality of first members are stacked and arranged in a first case and the plurality of second members are stacked and arranged in a second case separate from the first case;
a first inlet passage portion is provided at a first end portion of the first case and an outlet passage portion is provided at a second end portion of the first case which is opposite to the first end portion of the first case;
a second inlet passage portion is provided at a first end portion of the second case and an intermediate passage portion is provided at a second end portion of the second case which is opposite to the first end portion of the second case; and
the first inlet passage portion is connected to the second inlet passage portion via a first connection hose and the outlet passage portion is connected to the intermediate passage portion via a second connection hose.

23. The cooling structure according to claim 22, wherein the first inlet passage portion, the outlet passage portion, the second inlet passage portion and the intermediate passage portion are provided at end sides of the plurality of fluid passages.

24. A cooling structure for a device mounted to a vehicle, the cooling structure comprising:
a plurality of heat generating members, each of the plurality of heat generating members having a plate shape; and
a plurality of heat-exchanging plate members arranged to have a plurality of receiving spaces for receiving the heat generating members and a plurality of fluid passages through which a fluid flows, wherein
the heat generating members are located in the receiving spaces to be cooled by the fluid flowing through the fluid passages from two sides of each heat generating member through the heat-exchanging plate members;
the plurality of heat generating members include a plurality of first members and a plurality of second members, the plurality of second members having a control temperature higher than a control temperature of the plurality of first members;
the plurality of fluid passages include a plurality of first passages disposed between adjacent first members and a plurality of second passages disposed between adjacent second members;
a total number of the plurality of second passages is smaller than a total number of the plurality of first passages;
all fluid having passed through the plurality of first passages flows through the plurality of second passages; and
a total passage sectional area of the plurality of second passages between the adjacent second members is smaller than a total passage sectional area of the plurality of first passages between the adjacent first members.

25. The cooling structure according to claim 24, further comprising
an electrical insulating member inserted between adjacent two of the heat generating members and the heat-exchanging plate members,
wherein the heat generating members are electrical members.

26. The cooling structure according to claim 24, further comprising
a spring member which is disposed to generate a spring force in a direction for press-contacting the heat generating members and the heat-exchanging plate members to each other.

27. The cooling structure according to claim 24, further comprising
a case in which all the heat generating members are accommodated.

28. The cooling structure according to claim 24, wherein: the heat generating members include at least first and second different heat generating members which have approximately equal plate surfaces.

29. The cooling structure according to claim 24, wherein: the heat generating members include at least a first heat generating member operated to be lower than a first control temperature, and a second heat generating member operated to be lower than a second control temperature higher than the first control temperature.

30. The cooling structure according to claim 29, further comprising
a thermal insulating member arranged between the first heat generating member and the second heat generating member.

31. The cooling structure according to claim 29, wherein the second heat generating member is arranged downstream from the first heat generating member in a flow direction of the fluid.

32. The cooling structure according to claim 29, wherein the first heat generating member is a battery part, the second heat generating member is a DC voltage converter, and the fluid is water.

33. The cooling structure according to claim 32, further comprising
a radiator which is disposed to heat a seat of the vehicle using the water from the fluid passages as a heat source.

34. The cooling structure according to claim 29, wherein the first heat generating member is a battery part, the second heat generating member is a DC voltage converter, and the fluid is air.

35. The cooling structure according to claim 34, wherein the fluid is air inside a passenger compartment of the vehicle.

36. The cooling structure according to claim 29, wherein the fluid is water, the cooling structure further comprising
means for switching fluid passage such that water, heated by the first heat generating member and the second heat generating member to a predetermined temperature flows, into an engine cooling water circuit for cooling a vehicle engine.

37. The cooling structure according to claim 29, wherein the fluid is water, the cooling structure further comprising
means for switching fluid passages such that water heated by the second heat generating member directly returns to the first heat generating member.

38. The cooling structure according to claim 24, wherein: the plurality of first members operate to be lower than a first control temperature, and the plurality of second members operate to be lower than a second control temperature higher than the first control temperature.

39. The cooling structure according to claim 24, wherein the plurality of first members operate to be lower than a first control temperature, and the plurality of second members operate to be lower than a second control temperature higher than the first control temperature, the cooling structure further comprising means for setting a flow speed of the fluid in the plurality of second passages between the second heat generating members to be higher than a flow speed of the fluid in the plurality of first passages between the first heat generating members.

40. The cooling structure according to claim 39, wherein the second members are arranged downstream from the first members in a flow direction of the fluid.

41. The cooling structure according to claim 39, wherein a total passage sectional area of the plurality of second passages between the second members is smaller than a total passage sectional area of the plurality of first passages between the first members.

42. The cooling structure according to claim 24, wherein the fluid flowing through the fluid passages is water, the cooling structure further comprising at least one of a radiator arranged in a water circuit, for cooling the water flowing to the fluid passage by performing heat exchange with air, and a water-refrigerant heat exchanger for cooling water flowing to the fluid passages by performing heat exchange with refrigerant in a refrigerant cycle.

43. The cooling structure according to claim 24, further comprising a case for accommodating the heat generating members, wherein the case is located under a seat of the vehicle.

44. The cooling structure according to claim 24, wherein:
the heat generating members are stacked and accommodated in one case, the cooling structure further comprising
first and second fluid passage portions provided at two end sides of the first and second passages to extend in a stacking direction of the heat generating members, and
the first and second members are disposed between the first and second passage portions.

45. The cooling structure according to claim 24, wherein:
the first and second passages are configured such that a flow amount of the fluid flowing through each second passage is larger than a flow amount of the fluid flowing through each first passage.

46. The cooling structure according to claim 24, wherein each of the fluid passages is disposed between opposing surfaces of the adjacent heat generating members and the fluid passages pass the fluid along an entire length of the opposing surfaces of the adjacent heat generating members.

47. The cooling structure according to claim 24, wherein:
the plurality of first members are stacked and arranged in a first case and the plurality of second members are stacked and arranged in a second case separate from the first case;
a first inlet passage portion is provided at a first end portion of the first case and an outlet passage portion is provided at a second end portion of the first case which is opposite to the first end portion of the first case;
a second inlet passage portion is provided at a first end portion of the second case and an intermediate passage portion is provided at a second end portion of the second case which is opposite to the first end portion of the second case; and
the first inlet passage portion is connected to the second inlet passage portion via a first connection hose and the outlet passage portion is connected to the intermediate passage portion via a second connection hose.

48. The cooling structure according to claim 47, wherein the first inlet passage portion, the outlet passage portion, the second inlet passage portion and the intermediate passage portion are provided at end sides of the plurality of fluid passages.

49. A cooling structure for a battery device of a vehicle, the cooling structure comprising:
a plurality of first heat generating members accommodated in a first case and a second case which are separate from each other and are located under a seat of the vehicle;
a plurality of second heat generating members adapted to have a control temperature higher than that of the first heat generating members, the second heat generating members being located only in the second casing;
a plurality of first fluid passages each of which is provided between adjacent first heat generating members, and a plurality of second fluid passages each of which is provided between adjacent second heat generating members;
a coolant circuit in which the first and second fluid passages are provided, the coolant circuit being coupled to an engine coolant circuit of the vehicle;
a heat exchanger configured to cool the coolant by using a refrigerant cycle located in the vehicle;
a total number of the second fluid passages is smaller than a total number of the first fluid passages; and
the second fluid passages are provided such that the coolant having passed through the first fluid passages flows through the second fluid passages; and
a total passage sectional area of the plurality of second passages between the adjacent second heat generating members is smaller than a total passage sectional area of the plurality of first passages between the adjacent first heat generating members.

50. The cooling structure according to claim 49, wherein:
the plurality of first heat exchanging members are stacked and arranged in a first case and the plurality of second heat exchanging members are stacked and arranged in a second case separate from the first case;
a first inlet passage portion is provided at a first end portion of the first case and an outlet passage portion is provided at a second end portion of the first case which is opposite to the first end portion of the first case;
a second inlet passage portion is provided at a first end portion of the second case and an intermediate passage portion is provided at a second end portion of the second case which is opposite to the first end portion of the second case; and
the first inlet passage portion is connected to the second inlet passage portion via a first connection hose and the outlet passage portion is connected to the intermediate passage portion via a second connection hose.

51. The cooling structure according to claim 50, wherein the first inlet passage portion, the outlet passage portion, the second inlet passage portion and the intermediate passage portion are provided at end sides of the plurality of fluid passages.

* * * * *